US012229730B2

(12) United States Patent
Mitchell et al.

(10) Patent No.: US 12,229,730 B2
(45) Date of Patent: Feb. 18, 2025

(54) INFERRING MEETING EXPENSE VIA A MEETING EXPENSE AND VERIFICATION CONTROLLER

(71) Applicant: T-Mobile USA, Inc., Bellevue, WA (US)

(72) Inventors: Michael Mitchell, North Bend, WA (US); Peter Myron, Fall City, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 353 days.

(21) Appl. No.: 17/180,604

(22) Filed: Feb. 19, 2021

(65) Prior Publication Data

US 2022/0270054 A1 Aug. 25, 2022

(51) Int. Cl.
*G06Q 10/00* (2023.01)
*G06Q 10/1093* (2023.01)
*G06Q 30/00* (2023.01)
*G06Q 30/0283* (2023.01)

(52) U.S. Cl.
CPC ..... *G06Q 10/1095* (2013.01); *G06Q 30/0283* (2013.01)

(58) Field of Classification Search
CPC ............................. G06Q 10/00; G06Q 50/00
USPC ................................................ 705/7.11–7.42
See application file for complete search history.

(56) References Cited

U.S. PATENT DOCUMENTS

| 7,046,779 | B2 | 5/2006 | Hesse |
| 8,121,953 | B1 | 2/2012 | Orttung et al. |
| 8,284,676 | B1 | 10/2012 | Lenard et al. |
| 8,306,911 | B1 | 11/2012 | Heath et al. |
| 8,788,309 | B2* | 7/2014 | O'Sullivan ........ G06Q 10/1091 705/7.18 |
| 9,065,919 | B2 | 6/2015 | Arthur et al. |
| 10,706,731 | B2 | 7/2020 | Harper-Ray et al. |
| 10,909,867 | B2 | 2/2021 | Benz |
| 10,917,608 | B1 | 2/2021 | Faulkner et al. |
| 2002/0065689 | A1 | 5/2002 | Bingham et al. |
| 2005/0010464 | A1 | 1/2005 | Okuno et al. |
| 2009/0319297 | A1* | 12/2009 | Hernandez ............. G16H 50/30 705/2 |
| 2011/0040591 | A1 | 2/2011 | Durocher et al. |
| 2011/0071862 | A1 | 3/2011 | Cator et al. |

(Continued)

FOREIGN PATENT DOCUMENTS

WO 2019227071 A1 11/2019

OTHER PUBLICATIONS

Tresor Mvumbi, et al. 2012. An online meeting tool for low bandwidth environments. In Proceedings of the South African Institute for Computer Scientists and Information Technologists Conference (SAICSIT '12). Association for Computing Machinery, New York (Year: 2012).

(Continued)

*Primary Examiner* — Mustafa Iqbal

(57) ABSTRACT

This disclosure describes techniques that enable a Meeting Expense and Verification (MEV) controller to infer the meeting expense of a proposed meeting. The MEV controller may analyze a meeting request to identify meeting attendees, and in doing so, determine the meeting expense. In response to the meeting expense being greater than a predetermined meeting expense threshold, the MEV controller may suspend the meeting request.

20 Claims, 9 Drawing Sheets

(56) References Cited

U.S. PATENT DOCUMENTS

| | | | |
|---|---|---|---|
| 2013/0038673 | A1 | 2/2013 | Hiller et al. |
| 2015/0088997 | A1 | 3/2015 | van Dijk et al. |
| 2017/0339199 | A1 | 11/2017 | Saez |
| 2018/0176383 | A1* | 6/2018 | Kumar .................. H04L 65/403 |
| 2019/0019162 | A1 | 1/2019 | Yang et al. |
| 2019/0130365 | A1 | 5/2019 | Pell et al. |
| 2020/0334642 | A1* | 10/2020 | Vaananen ............... G06N 20/00 |
| 2020/0383008 | A1 | 12/2020 | Mallikarjunan et al. |
| 2021/0029619 | A1 | 1/2021 | Breaux, III et al. |
| 2021/0105147 | A1* | 4/2021 | Waugh .................. H04L 67/535 |
| 2021/0279823 | A1 | 9/2021 | Reis et al. |
| 2021/0314238 | A1 | 10/2021 | Cioffi et al. |
| 2021/0399911 | A1* | 12/2021 | Jorasch ............... H04L 12/1822 |
| 2022/0058754 | A1* | 2/2022 | O'Brien ........... G06Q 10/06311 |

OTHER PUBLICATIONS

U.S. Appl. No. 17/180,617, Final Office Action mailed Jun. 24, 2022, 74 pages.

U.S. Appl. No. 17/180,617, Office Action mailed Jan. 11, 2023, 69 pages.

Mostefa et al. "The CHIL audiovisual corpus for lecture and meeting analysis inside smart rooms." Language resources and evaluation 41.3 (2007): 389-407. (Year: 2007).

U.S. Appl. No. 17/180,617, Non-Final Office Action mailed Dec. 22, 2021, 61 pages.

U.S. Appl. No. 17/180,617, Office Action mailed Apr. 1, 2024, 61 pages.

Sherry, Lance. "A method for quantifying travel productivity for corporate travel managers", Journal of Air Transport Management. vol. 42 (2015), pp. 118-124. (Year: 2015).

Eby, Kate. How to Calculate productivity at all level: employee, organization, and software. URL: <https://www.smartsheet.com/blog/how-calculate-productivity-all levels-organization-employee-and-software> (Year. 2015).

Marker, Andy. Free Business Budget Templates for Any Company. URL: <https://www.smartsheet.com/contentcenter/author/Andy%20Marker> (Year: 2017).

U.S. Appl. No. 17/180,617, Final Office Action mailed Aug. 23, 2023, 81 pages.

U.S. Appl. No. 17/180,617, Final Office Action mailed Nov. 14, 2024, 42 pages.

* cited by examiner

INFERRING MEETING EXPENSE VIA A MEETING EXPENSE AND VERIFICATION CONTROLLER

BACKGROUND

Organizations typically rely on meetings to communicate information to their personnel from multiple national or even international locations. The choice of venue often depends on which people plan to attend in person and which people plan to attend virtually (e.g., by teleconference, video conference, web conference, etc.).

Notwithstanding the value of communication, meetings can incur indirect costs that are not discernable to meeting planners. Meeting attendees that choose to attend a meeting in-person may lose "worktime value" while traveling to and from a meeting location, and while attending the meeting, itself. Worktime value lost during meetings is typical for attendees that join meetings in-person and virtually. While an organization may position itself to absorb worktime lost for a small subset of its personnel, large groups of personnel that attend meetings may result in a low worktime value for the organization, as a whole. An organization's loss of worktime value due to large group meeting attendance is an indirect cost that is not readily accounted for when planning group meetings, and which ultimately may adversely impact an organization's performance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
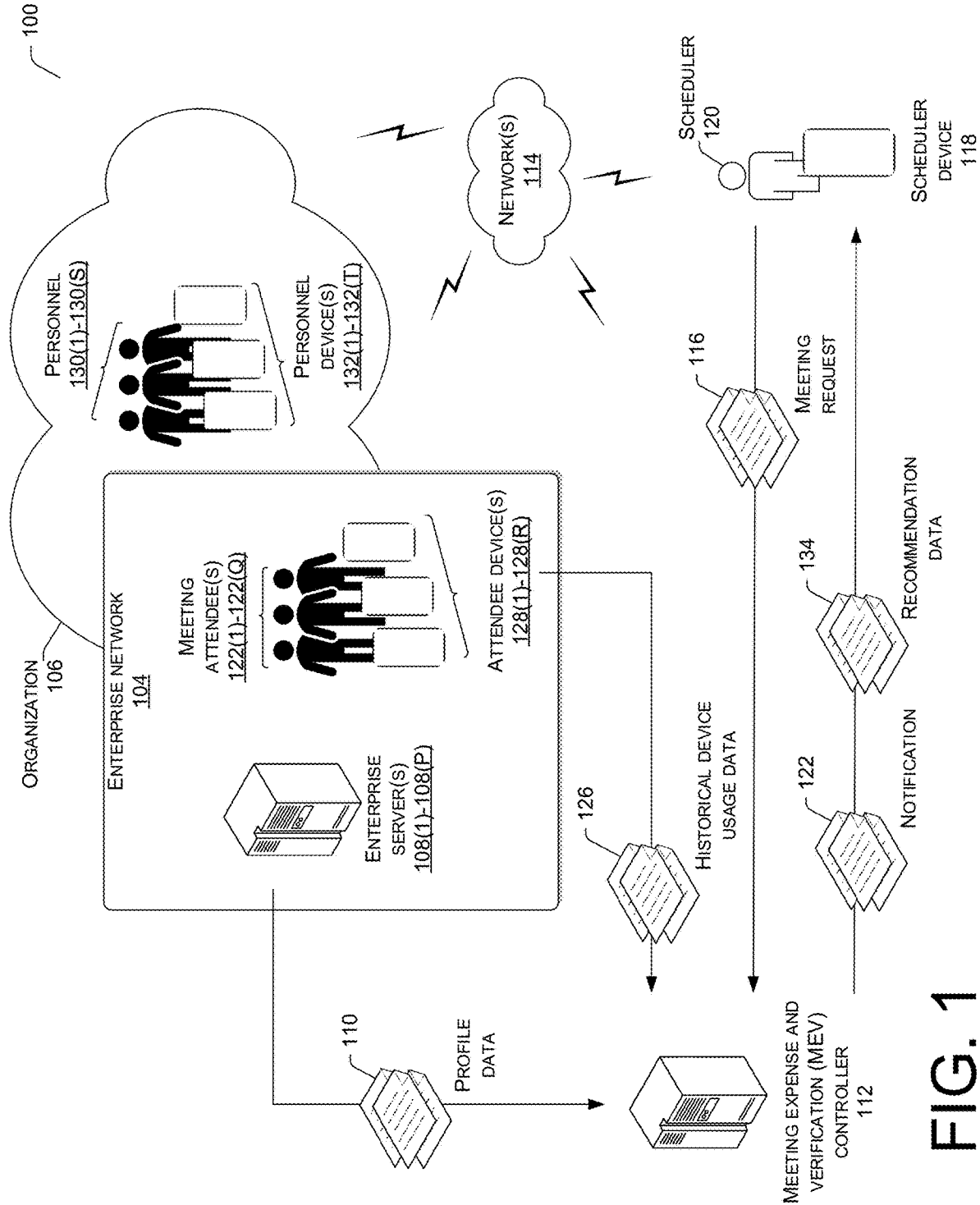
FIG. 1 illustrates an example computing environment that facilitates a Meeting Expense and Verification (MEV) controller in determining the meeting expense of a proposed meeting.

This disclosure describes techniques that facilitate inferring the lost work time (LWT) value of individuals attending scheduled meetings. The LWT value is a measure of working value lost during a workday and within a workplace environment due to an intervening event. Scheduled meetings (e.g., intervening events) can, and often do, add value to an individual's work-life, however, the time required to attend scheduled meetings can result in a direct loss of available work time that would have normally been committed to performing assigned work duties.

Since meetings often include personnel with various roles within an organization, the LWT value of one person is not necessarily the same as the LWT value of other personnel. For example, if a company director attends a meeting alongside a junior officer, the LWT value of the company director is likely to exceed that of the junior officer, even though both personnel lost the same amount of time by attending the same meeting. The delta can be understood by the difference in their contributions to the organization, which is often reflected in their respective hourly rates. The term "hourly rate," as used herein, describes the amount of money that an organization charges for an hour of a personnel's time. Accordingly, the hourly rate of a company director is likely to exceed that of a junior officer. Even though the company director and junior officer each lost the same amount of time by attending the same meeting, the organization absorbed markedly different LWT values based on their respective hourly rates.

Accordingly, this disclosure describes a Meeting Expense and Verification (MEV) controller that is configured to calculate a meeting expense associated with the LWT value of the meeting attendees. The MEV controller may analyze a meeting request to identify meeting attendees, and for each meeting attendee, the MEV controller may determine the total work time lost due to attending the meeting and multiply the total worktime lost by the meeting attendee's hourly rate, the result of which is the LWT value. The meeting expense equates to an aggregate of LWT value for all meeting attendees invited to the proposed meeting.

The MEV controller may calculate a meeting expense for in-person meetings and virtual meetings. The total work time lost for virtual meetings and in-person meeting each include at least preparatory time and the meeting duration. Preparatory time may account for preparation of the meeting content and setup for the meeting itself. For a virtual meeting, preparatory time may include internet connection checks, microphone checks, and headset troubleshooting checks. For an in-person meeting, preparatory time may also include setup of visual aids at the meeting location. Notwithstanding, the total work time lost for in-person meetings may also include the time required for the meeting attendee to travel to the meeting location and back from the proposed meeting location. Thus, total worktime lost for in-person meetings can vary between meeting attendees based on their location prior to a meeting, and their respective travel routes to the meeting location.

In one embodiment, the MEV controller may intercept, from a scheduler device, a meeting request for a proposed meeting. The meeting request may include a meeting time, meeting duration, a meeting format (e.g., virtual meeting, in-person meeting, or a suitable combination of both), meeting subject-matter, and a list of meeting attendees. The list of meeting attendees may include personnel within an organization.

The MEV controller may interact with an enterprise server of an organization, to retrieve profile data associated with each of the meeting attendees (e.g., personnel of the organization), and in doing so, identify an hourly rate that is to be used to calculate their respective LWT value.

For virtual meetings, the MEV controller may calculate the LWT value for each meeting attendee by multiplying the meeting duration (e.g., LWT) by the meeting attendee's hourly rate. The MEV controller may determine a meeting expense for the proposed meeting by aggregating the LWT value of all, or substantially all, meeting attendees.

For in-person meetings, the LWT value includes a component of time that is lost due to travel to and from the meeting location. Lost time due to travel depends on the starting location of the meeting attendee immediately prior to a proposed meeting. The MEV controller may infer the starting location of each meeting attendee in several ways. In one embodiment, the profile data may include historical calendar data associated with the meeting attendee that is captured over a predetermined time interval. Here, the MEV controller may employ one or more trained machine-learning algorithms to infer the location of the meeting attendee throughout each workday based at least in part on the historical calendar data. The MEV controller may be configured to further account for environmental factors that have historically impacts meetings at particular meeting locations. Environmental factors may include, without limitation, vehicle parking availability at the meeting location, walking distance from a vehicle parking location to the meeting location, and public-road traffic conditions en-route to the meeting location.

In another embodiment, the MEV controller may monitor the location of an attendee device associated with a meeting attendee over a predetermined time interval. The MEV controller may employ one or more trained machine-learning algorithms to infer the location of the meeting attendee throughout each workday based at least in part on the monitored location data of the meeting attendee's attendee device.

In yet another embodiment, the MEV controller may generate a data model based on a suitable combination of historical calendar data and historical monitored location data. The MEV controller may infer the starting location of the personnel by correlating the proposed meeting start-time with data points of the data model. As more historical calendar data and historical monitored location data becomes available, a continuously more accurate data model can be developed.

In response to inferring a starting location of a meeting attendee (e.g., personnel), the MEV controller may determine the time required to travel to the proposed meeting location, and vice versa. Therefore, LWT due to a proposed meeting equates to the meeting duration and the travel time to and from the proposed meeting location. The MEV controller may calculate the LWT value of each meeting attendee by multiplying the LWT by the meeting attendee's hourly rate. A meeting expense for the meeting may be based on an aggregate of LWT value of all, or substantially all, meeting attendees.

In response to calculating the meeting expense for the proposed meeting, the MEV controller may compare the meeting expense with a predetermined meeting expense threshold. The predetermined meeting expense threshold may be set by an operator of the MEV controller or a representation of the organization within which the MEV controller operates. If the meeting expense is greater than the predetermined meeting expense threshold, the MEV controller may determine that the proposed meeting is an inefficient use of resources and suspend executing the meeting request. The MEV controller may transmit a message to an attendee device associated with the meeting scheduler indicating that the proposed meeting request was suspended due to the meeting expense.

In some examples, the MEV controller may identify, via an enterprise server of the organization, an authorizing party with credentials to approve the meeting request despite the meeting expense exceeding the predetermined meeting expense threshold. The MEV controller may transmit a subsequent message to the authorizing party indicating that the meeting request has been suspended due to the meeting expense. The message may further include at least two selectable options, namely, to confirm the meeting request suspension or approve the meeting request. If the authorizing party elects to confirm the meeting suspension, the MEV controller may terminate the meeting request. Otherwise, if the authorizing party elects to approve the meeting request, the MEV controller may permit the meeting request to occur.

Rather than providing a binary solution to meeting requests (e.g., approval or denial), the MEV controller may be configured to recommend changes to a proposed meeting request. In one embodiment, the MEV controller may calculate a weighted LWT value rather than an LWT value for a high-value meeting attendee (e.g., relatively high LWT relative to other meeting attendees). The high-value meeting attendee may correspond to an organizational manager or company director. In contrast to the LWT value, the weighted LWT value may include a productivity fraction, which accounts for an inferred level of productivity of a meeting attendee that is typically exhibited during the scheduled meeting time. The productivity fraction is used to factor the hourly rate of the meeting attendee to generate a reduced, weighted LWT value that more closely reflects lost productivity. The productivity fraction may be expressed as a fraction of one (1). A productivity fraction of 1 may reflect a maximum level of productivity, 0.1 may represent 10% productivity, and zero may represent no productivity. Therefore, if a meeting attendee, such as the high-value meeting attendee, is typically unproductive during the proposed meeting time (e.g., productivity faction <0.3), the weighted LWT value would be appreciably lower than the LWT value, which does not account for the meeting attendee's productivity.

To infer a productivity fraction, the MEV controller may retrieve historical device usage data associated with an attendee device of a meeting attendee. The historical device usage data may include historical calendar data, historical internet browser logs, historical user application logs, and/or so forth. Here, the MEV controller may employ one or more machine-learning algorithms to calculate a productivity fraction to each workday time increment based on the historical device usage data. For example, the MEV controller may infer that during the hours of 9 am—10 am, the meeting attendee is typically browsing the internet while reviewing work emails. The MEV controller may determine that the productivity fraction during the time increment of 9 am—10 am is low (e.g., productivity fraction <0.3) relative to another time increment within which the meeting attendee is exclusively accessing work-related user applications (e.g., productivity level >0.8). Accordingly, the MEV controller may calculate the weighted LWT value as a product of the LWT value and the productivity fraction.

In another embodiment, the MEV controller may identify one or more high-value meeting attendees (e.g., high weighted LWT value relative to other meeting attendees). In doing so, the MEV controller may determine an alternate meeting time for the proposed meeting that reduces the meeting attendee's weighted LWT value. Since the weighted LWT value is a function of the meeting time (e.g., productivity fraction of the weighted LWT value is tied to a workday time increment), by proposing an alternate meeting time that coincides with a less productive timeslot of a high-value meeting attendee (e.g., lower productivity fraction), the weighted LWT value for the alternate meeting time may be less than the weighted LWT value for the originally proposed meeting time, which in turn may reduce the overall meeting expense.

In another embodiment, rather than rescheduling the proposed meeting to another time, the MEV controller may identify an alternate meeting attendee to attend the meeting in place of a high-value meeting attendee (e.g., meeting attendee with a high weighted/LWT value relative to other meeting attendees). In one example, the MEV controller may analyze the meeting request to identify a meeting subject matter associated with the proposed meeting. The MEV controller may further analyze profile data of the high-value meeting attendee along with other suitable personnel of the organization, to identify colleagues or supervisees of the high-value meeting attendee that belong to a workgroup related to the meeting subject matter. From the pool of colleagues and supervisees identified, the MEV controller may identify a subset of colleagues and supervisees as alternate meeting attendees, based on the relevance of their respective profile data to the meeting subject matter. Additionally, the selection of alternate meeting attendees may be based on their inferred lower weighted/LWT value relative to that of the high-value meeting attendee.

The MEV controller may present the set of alternate meeting attendees to the high-value meeting attendee for selection. Here, the MEV controller may transmit a notification to an attendee device associated with the high-value meeting attendee that lists the set of alternate attendees and requests a selection. Upon receipt of a selection, the MEV controller may replace the meeting invitation intended for the high-value meeting attendee with a meeting invitation for the selected alternate attendee. The MEV controller may then recalculate the meeting expense based on the revised weighted/LWT value of the alternate attendee.

In yet another embodiment, the MEV controller may attempt to reduce the meeting expense of a proposed meeting by recommending a change in meeting format from an in-person meeting to a virtual meeting, for a subset, or all, meeting attendees. For an in-person meeting, the MEV controller may calculate a travel component of the weighted/LWT value for each meeting attendee that is associated with travel to and from the proposed meeting location. The MEV controller may aggregate the travel component of the weighted/LWT value for each meeting attendee to determine a travel meeting expense. If the travel meeting expense is greater than a predetermined travel expense threshold, the MEV controller may recommend, to the meeting scheduler, a change in meeting format, from an in-person meeting to a virtual meeting.

The MEV controller may recommend that the meeting format change for all, or substantially all, meeting attendees of the proposed meeting. Alternatively, the MEV controller may recommend that the meeting format change for a subset, but not all, of the meeting attendees. Selection of the subset may be based on their respective weighted/LWT value due to travel.

In addition to inferring the meeting expense of proposed meetings, this disclosure also describes techniques that facilitate monitoring real-time meeting attendance and calculating an actual meeting expense based on a meeting attendance record. The MEV controller may be configured to receive, from a scheduler device, meeting data associated with a scheduled meeting occurring at a scheduled meeting location and at a scheduled meeting time. The scheduled meeting may be an in-person meeting or a virtual meeting. For a virtual meeting, the meeting location is a virtual meeting platform. For an in-person meeting, the meeting format is the geographic location of the meeting.

For an in-person meeting, the MEV controller may interact with an enterprise server to identify attendee devices of meeting attendees. The MEV controller may monitor the geolocation of the attendee devices during the scheduled meeting to determine whether the meeting attendees are present at the scheduled meeting. In some examples, the MEV controller may monitor the geolocation of the attendee devices continuously during the scheduled meeting or per a predetermined schedule. The predetermined schedule may be based on any suitable time interval, such as one minute, five minutes, or ten minutes. By monitoring the geolocation of the attendee devices throughout the scheduled meeting, the MEV controller may determine whether each meeting attendee is present for the entire scheduled meeting, or a portion of the scheduled meeting. For example, a meeting attendee may arrive late, leave early, or briefly step out of the meeting.

Further, the MEV controller may generate a meeting attendance record that identifies meeting attendees that were present during the scheduled meeting, and whether the meeting attendees were present for the entire meeting or a portion, but not all, of the scheduled meeting.

In some examples, the MEV controller may be configured to interact with network devices that are present at a geolocation of a scheduled meeting. The network devices may include Wi-Fi routers, Internet of Things (IoT) devices, wireless beacons, or any other suitable type of wireless technology device that can send and receive Radio Frequency (RF) signals via a wireless communication protocol. The MEV controller may capture, from each network device at the meeting location, electronic handshake data associated with interactions between the network device and nearby electronic devices. The electronic devices may include the attendee devices of meeting attendees. An electronic handshake is intended to establish a communication connection between a network device and an in-range electronic device. The range that a network device may operate may depend on the wireless communications protocol used to establish a communication connection. A network device that uses a Wi-Fi communication protocol may have a more expansive range relative to a network device that uses a Bluetooth communication protocol. Therefore, the MEV controller may act to capture electronic handshake data from a plurality of available network devices within a meeting location.

Also, the MEV controller may verify the presence of meeting attendees via sensor data captured from sensors at the meeting location. Sensors may include camera sensors used to capture visual data and audio data, and microphone sensors used to capture audio data. Sensor data may include visual data and audio data.

The MEV controller may analyze the sensor data relative to registered biometric profiles of the meeting attendees. For example, the MEV controller may retrieve, from an enterprise server, registered biometric profiles of each meeting attendee. Each registered biometric profile may include a visual profile and an audio profile of the meeting attendee. The MEV controller may employ one or more trained machine-learning algorithms to analyze the sensor data relative to the registered biometric profiles for each meeting attendee to determine whether the meeting attendee was present during the scheduled meeting. The MEV controller may capture the sensor data continuously during the scheduled meeting or per a predetermined schedule. The predetermined schedule may be based on any suitable time interval, such as one minute, five minutes, or ten minutes. By capturing the sensor data throughout the scheduled meeting, the MEV controller may determine whether the meeting attendee was present for the duration of the scheduled meeting, or a portion of the scheduled meeting.

For a virtual meeting, the meeting format may be a virtual meeting platform. Here, the MEV controller may interact with the virtual meeting platform to identify the Internet Protocol (IP) addresses associated with meeting attendees that attend the scheduled meeting. The MEV controller may interact with an enterprise server to associate each IP address with a meeting attendee. In doing so, the MEV controller may determine whether a meeting attendee was present during a meeting, based at least in part on detecting their IP address on the virtual meeting platform. The MEV controller may capture IP addresses from the virtual meeting platform continuously or per a predetermined schedule. The predetermined schedule may be based on any suitable time interval, such as one minute, five minutes, or ten minutes. By capturing the IP addresses multiple times during the virtual meeting, the MEV controller may determine whether the meeting attendee was present for the duration of the virtual meeting, or a portion, but not all, of the virtual meeting.

The MEV controller may collate meeting attendance records captured via the various methods described within this disclosure to generate an overall meeting attendance record. The MEV controller may parse through the meeting attendance record to eliminate duplicate meeting attendee entries. Duplicate entries may occur due to the MEV controller detecting the presence of the same meeting attendee via different methods. For example, The MEV controller may detect the presence of a meeting attendee via electronic handshake data and via sensor data captured at the meeting location.

For scheduled meetings that occur in-person and virtually at the same time, the overall meeting attendance record may comprise an aggregate of an in-person meeting attendance record and a virtual meeting attendance record.

After generating a meeting attendance record for the scheduled meeting, the MEV controller may calculate an actual meeting expense for the meeting based on the list of verified meeting attendees and the time spent by each verified meeting attendee at the meeting. The method of calculating actual meeting expense includes operations previously described with reference to calculating the meeting expense of a proposed meeting, but through the list of actual meeting attendees rather than a list of proposed meeting attendees. As such, for brevity and ease of description, various details relating to the calculation of the actual meeting expense has been omitted herein to the extent that the same or similar details have been provided with reference to calculating the meeting expense of a proposed meeting.

Throughout this disclosure, the terms "personnel," and "meeting attendee" are used interchangeably. Since the proposed meetings, scheduled meetings, and actual meetings, have been described within the setting of an organization, meeting attendees of an organization's meetings are typically also personnel. While the MEV controller is described as operating within an organizational setting, one of ordinary skill in the art may appreciate that variations and modifications can be made such that the MEV controller may perform substantially equivalent functions in public, private, and/or community-sponsored gatherings.

Further, the term "techniques," as used herein, may refer to system(s), method(s), computer-readable instruction(s), module(s), algorithms, hardware logic, and/or operation(s) as permitted by the context described above and through the document.

FIG. 1 illustrates an example computing environment that facilitates a Meeting Expense and Verification (MEV) controller in determining the meeting expense of a proposed meeting. The proposed meeting may involve personnel 102(1)-102(N) within an organization's enterprise network 104. The organization 106 may be any public or private organization that functionally relies on the services of its personnel 102(1)-102(N). Personnel 102(1)-102(N) may include employees, vendors, contractors, or any other individuals that interact with the organization 106 through its enterprise network 104.

The enterprise network 104 may include network infrastructure that supports an operation of the organization 106. The enterprise network 104 may comprise one or more enterprise server(s) 108(1)-108(P), each of which maintains data relating to the organization 106 and its personnel 102(1)-102(N). For example, the enterprise server(s) 108(1)-108(P) may store profile data 110 of its personnel 102(1)-102(N). Profile data 110 may include, without limitation, personnel hardware device identifiers, IP addresses associated with personnel attendee devices, login credentials, authentication tokens, authorization tokens, personnel hourly rate data, current and historical personnel calendar data, and workgroups within which personnel belong. Workgroups may be project-specific or discipline-specific. Project-specific workgroups bring together personnel from varying disciplines to deliver on a specific statement of work. Discipline-specific workgroups relate field expertise, such as accounting, business development, engineering, and/or so forth.

The MEV controller 112 may reside within the enterprise network 104 or may interact with the enterprise network 104 via one or more network(s) 114. The MEV controller 112 may intercept a meeting request 116 for a proposed meeting from a scheduler device 118 associated with a scheduler 120. The MEV controller 112 may analyze the meeting request 116 to determine a meeting expense. Once a meeting request 116 is intercepted, the meeting setup is suspended until the MEV controller 112 determines whether the meeting expense is acceptable.

The MEV controller 112 may parse through the meeting request 116 to identify a list of meeting attendee(s) 122(1)-122(Q). The list of meeting attendees may comprise some, or all, personnel 102(1)-102(N) within the enterprise network 104. For example, "all-hands," meeting request 116 may include a list of meeting attendee(s) 122(1)-122(Q) that comprise substantially all personnel 102(1)-102(N) within the enterprise network 104. Alternatively, a "project-specific" or "discipline-specific" meeting request 116 may include a list of meeting attendee(s) 122(1)-122(Q) that comprise fewer than all personnel 102(1)-102(N).

The MEV controller 112 may retrieve, from the enterprise server(s) 108(1)-108(P), profile data 110 associated with each of the meeting attendee(s) 122(1)-122(Q) listed on the meeting request 116. For each meeting attendee, the MEV controller 112 may determine an LWT value. The LWT value is based on the meeting attendee's hourly rate, which may be derived from the meeting attendee's profile data 110. The MEV controller 112 may aggregate the LWT value for each of the meeting attendee(s) 122(1)-122(Q) to determine the meeting expense. If the meeting expense is less than or equal to a predetermined meeting expense threshold, the MEV controller 112 may permit the meeting request 116 to occur and transmit a notification 124 to the scheduler device 118, indicating the same.

If the meeting expense is greater than a predetermined meeting expense threshold, the MEV controller 112 may perform one of several actions. In one embodiment, the MEV controller 112 may transmit an indication to an authorizing party device within the enterprise network 104 requesting approval of the meeting request 116 despite the meeting expense amount.

In another embodiment, the MEV controller 112 may refine an analysis of the meeting request 116 by calculating a weighted LWT value for some or all meeting attendee(s) 122(1)-122(Q). The weighted LWT value comprises the LWT value multiplied by a productivity fraction. To calculate the productivity fraction, the MEV controller 112 may capture and analyze historical device usage data 126 associated with each meeting attendee. The MEV controller 112 may capture the historical device usage data 126 from attendee device(s) 128(1)-128(R) associated with meeting attendee(s) 122(1)-122(Q). Since the meeting attendee(s) 122(1)-122(Q) are a subset of the personnel 130(1)-130(S) of the organization 106, the attendee device(s) 128(1)-128(R) are a subset of the personnel device(s) 132(1)-132(T). The MEV controller 112 may interact with the personnel device(s) 132(1)-132(T) of each personnel 130(1)-130(S) over a predetermined time interval to capture the historical device usage data 126.

The MEV controller 112 may re-calculate the meeting expense using the weighted LWT values, and if the re-calculated meeting expense is less than or equal to the predetermined meeting expense threshold, the MEV controller 112 may permit the meeting request to occur.

Otherwise, the MEV controller 112 may provide the scheduler device 118 with recommendation data 134 to reduce the meeting expense by altering the meeting time of the proposed meeting or selecting alternate meeting attendees. For example, the MEV controller 112 may propose an alternate meeting time that reduces the weighted LWT value for high-value meeting attendees (e.g., meeting attendee with a high weighted/LWT value relative to other meeting attendees), which in turn, may reduce the meeting expense to at least the predetermined meeting expense threshold.

Recommendation data 134 may also include replacing a high-value meeting attendee with an alternate meeting attendee to lower the meeting expense. The selection of an alternate meeting attendee may be based on identifying alternate personnel that is familiar with the meeting subject matter and have a lower weighted/LWT value relative to the originally invited meeting attendee.

The MEV controller 112 may transmit a notification 124 to the scheduler device 118 that includes the recommendation data 134 and selectable options to accept a recommendation or terminate the meeting request 116. In response to a receipt of a selection, the MEV controller 112 may revise the meeting request 116, based on the selection, and permit the revised meeting request to occur.

The one or more network(s) 114 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g., 5G-NR, LTE, 3G, 2G), or any suitable combination thereof.

Moreover, the scheduler device 118 and the personnel device(s) 132(1)-132(T) (e.g., a subset of the personnel device(s) 132(1)-132(T) corresponding to the attendee device(s) 128(1)-128(R)) may include any suitable electronic device, such as a television unit, a multimedia streaming device, a cellular phone, a smartphone, a tablet computer, an electronic reader, a media player, a gaming device, a personal computer (PC), a laptop computer, etc. The scheduler device 118 and the personnel device(s) 132(1)-132(T) may also include network devices that act as intermediaries with the Internet. It is noteworthy that the Internet is accessible via one or more network(s) 114. In some examples, the scheduler device 118 and the personnel device(s) 132(1)-132(T) may include a subscriber identity module (SIM), such as an eSIM, to identify each device to a telecommunication service provider (also referred to herein, as "telecommunications network").

The MEV controller 112 may operate on one or more distributed computing resource(s). The one or more distributed computing resource(s) may include one or more attendee device(s) that operate in a cluster or other configuration to share resources, balance load, increase performance, provide fail-over support or redundancy, or for other purposes. The one or more attendee device(s) may include one or more interfaces to enable communications with other networked devices, such as the scheduler device 118 via the one or more network(s) 114.

Figure 2:
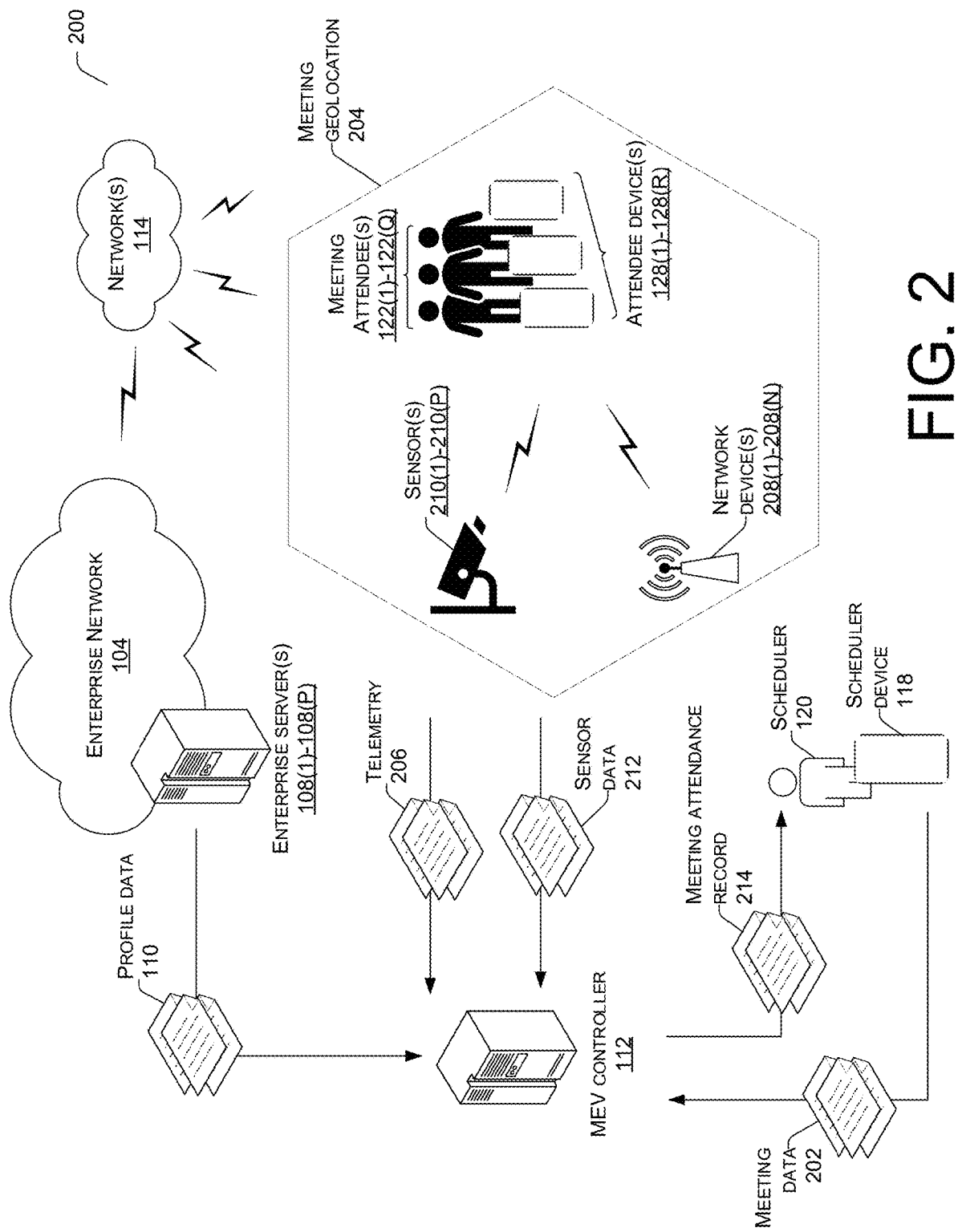
FIG. 2 illustrates an example computing environment that facilitates an MEV controller in verifying the attendance of a meeting attendee at a scheduled meeting.

FIG. 2 illustrates an example computing environment that facilitates an MEV controller in verifying the attendance of a meeting attendee at a scheduled meeting. FIG. 2 includes various details relating to an operation of the MEV controller 112 that was previously described with reference to FIG. 1. As such, for brevity and ease of description, various details relating to the MEV controller 112 have been omitted herein to the extent that the same or similar details have been provided with reference to FIG. 1.

In the illustrated example, the MEV controller 112 may interact with a scheduler device to receive meeting data 202 associated with a scheduled meeting within the enterprise network 104. The meeting data 202 may include a list of meeting attendee(s) 122(1)-122(Q) of an enterprise network 104 that are invited to attend a scheduled meeting. The scheduled meeting may be an in-person meeting or a virtual meeting, or a suitable combination of both. For an in-person meeting, the meeting format may correspond to the meeting geolocation 204 of the scheduled meeting. For a virtual meeting, the meeting format may be a virtual meeting platform.

For an in-person meeting, the MEV controller 112 may perform acts to detect and interact with attendee device(s) 128(1)-128(R) associated with each meeting attendee(s) 122(1)-122(Q) during the scheduled meeting. In one embodiment, the MEV controller 112 may use profile data 110 retrieved from the enterprise server(s) 108(1)-108(P) to identify attendee device(s) 128(1)-128(R) associated with each of the meeting attendee(s) 122(1)-122(Q). In this way, the MEV controller 112 may interact with the attendee device(s) 128(1)-128(R) during the scheduled meeting to receive telemetry data 206. Telemetry data 206 may include electronic handshake data, a timestamp, date-stamp, device identifier, and corresponding geolocation. The MEV controller 112 may use the telemetry data 206 to determine whether the meeting attendee(s) 122(1)-122(Q) were present during the scheduled meeting.

The MEV controller 112 may also interact with network device(s) 208(1)-208(N) located at the geolocation of an in-person meeting. The network device(s) 208(1)-208(N) may be configured to capture telemetry data 206 (e.g., electronic handshake data) associated with interactions between the network device(s) 208(1)-208(N) and nearby electronic devices, such as the attendee device(s) 128(1)-128(R). The telemetry data 206 captured from network device(s) 208(1)-208(N) may include substantially the same, or similar, data to the telemetry data 206 received from the attendee device(s) 128(1)-128(R).

The network device(s) 208(1)-208(N) may include Wi-Fi routers, Internet of Things (IoT) devices, wireless beacons, or any other suitable type of wireless technology device that can send and receive Radio Frequency (RF) signals via a wireless communication protocol. The wireless communications protocols may include, without limitation, Bluetooth, Zigbee, a cellular data protocol, or the like. The cellular data protocol may include 2G, 3G, Long-Term Evolution (LTE), 5G-New Radio (5G-NR).

The MEV controller 112 may also interact with sensor(s) 210(1)-210(P) located at the geolocation of an in-person meeting. Sensor(s) 210(1)-210(P) may include camera sensors, microphone sensors, or any suitable audiovisual sensor that is configured to capture sensor data 212 of meeting attendee(s) 122(1)-122(Q) at the meeting location. Sensor data 212 may include visual data, audio data, or a suitable combination of both.

The MEV controller 112 may analyze the telemetry data 206 and sensor data 212 to verify the attendance of meeting attendee(s) 122(1)-122(Q) at the scheduled meeting. Telemetry data 206 may be used to identify meeting attendee(s) 122(1)-122(Q) based on the device identifiers associated with their respective, attendee device(s) 128(1)-128(R). Sensor data 212 may be used to identify meeting attendee(s) 122(1)-122(Q) based on a comparison to stored biometric profiles of the meeting attendee(s) 122(1)-122(Q).

For virtual meeting(s), the MEV controller 112 may perform acts to detect the IP addresses of attendee device(s) 128(1)-128(R) associated with meeting attendee(s) 122(1)-122(Q). Accordingly, the MEV controller 112 may determine the attendance of meeting attendee(s) 122(1)-122(Q) based on detected IP addresses. Additionally, or alternatively, the MEV controller 112 may determine meeting attendance based on login credentials, hardware device identifiers, authentication tokens, authorization tokens, or any combination thereof.

The MEV controller 112 may generate meeting attendance record 214 that captures attendance data derived from the telemetry data 206 and sensor data 212 (e.g., in-person meeting), and IP address data (e.g., virtual meeting). The meeting attendance record 214 may include a list of verified meeting attendees and the time spent by each verified meeting attendee at the meeting. The MEV controller 112 may transmit the meeting attendance record 214 to the scheduler device 118.

Figure 3:
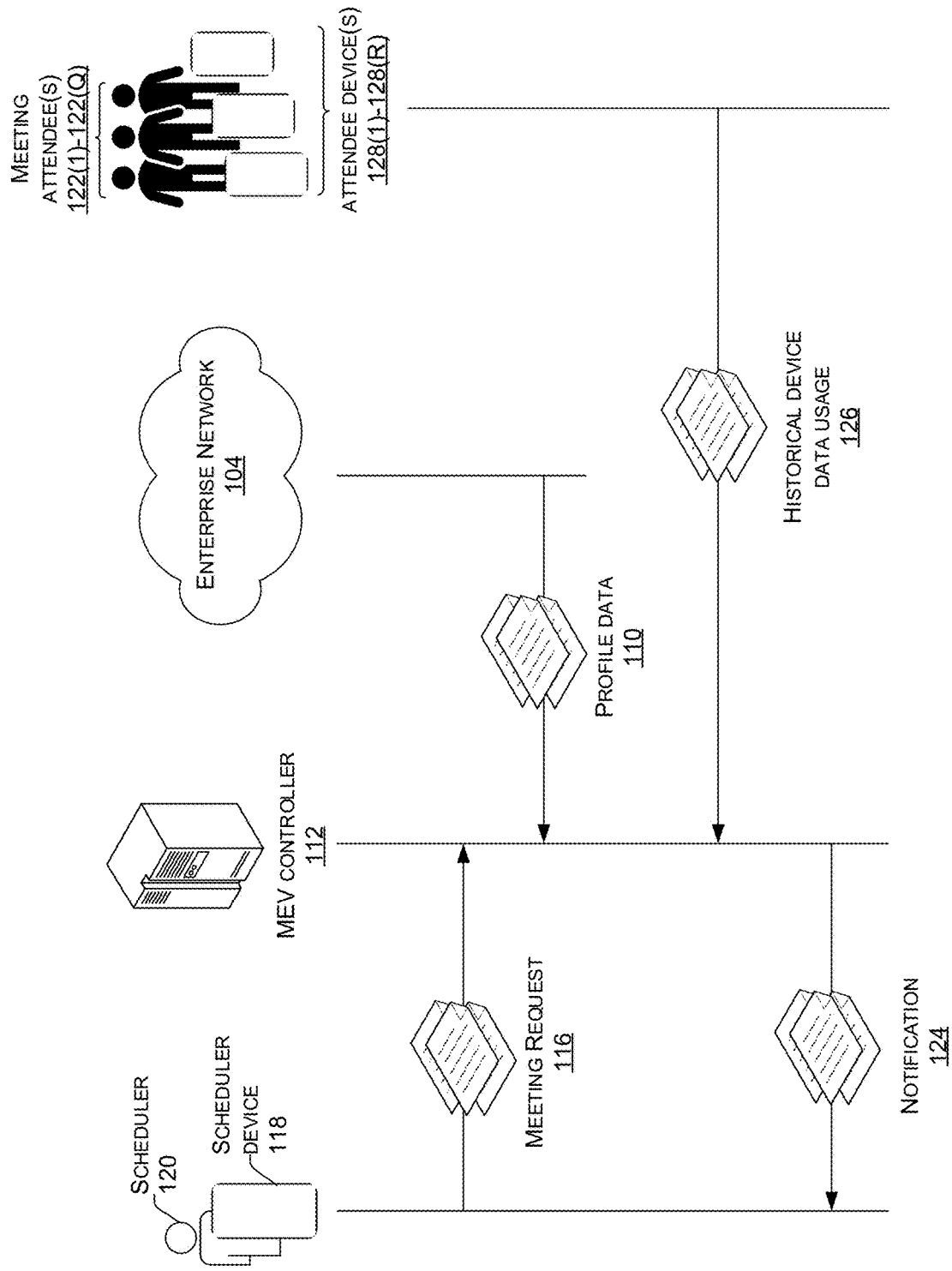
FIG. 3 illustrates a block diagram of an operation of the MEV controller in calculating a meeting expense, in accordance with at least one embodiment.

FIG. 3 illustrates a block diagram of an operation of the MEV controller in calculating a meeting expense, in accordance with at least one embodiment. The MEV controller 112 may intercept a meeting request 116 sent by a scheduler device to set up a proposed meeting within an enterprise network 104. The MEV controller 112 may retrieve, from an enterprise server of the enterprise network 104, profile data 110 associated with each meeting attendee listed in the meeting request 116. The MEV controller 112 may determine a meeting expense of the proposed meeting based on the meeting request 116 and the profile data 110. The meeting expense may comprise an aggregate of LWT values associated with each meeting attendee during the proposed meeting time. The LWT values may be based on an hourly rate of the meeting data (e.g., hourly rates sourced from the profile data) multiplied by the lost time due to the meeting.

If the MEV controller 112 determines that the meeting expense is greater than a predetermined meeting expense threshold, the MEV controller 112 may refine the meeting expense by calculating a weighted LWT value. The weighted LWT value may comprise the LWT value of a meeting attendee multiplied by a productivity fraction associated with the meeting attendee. The productivity fraction may represent a historical level of productivity for a meeting attendee during a workday time increment that coincides with the proposed meeting. Accordingly, the productivity fraction is specific to each meeting attendee and is further specific to the meeting time of the proposed meeting.

To calculate the weighted LWT value, the MEV controller may analyze historical data usage associated with each meeting attendee to determine a level of productivity typically exhibited during the proposed meeting time. The level of productivity may be represented as a productivity fraction that is multiplied to the LWT values to create a weighted LWT value. To calculate the productivity fraction, the MEV controller 112 may capture historical device usage data 126 from the attendee device(s) 128(1)-128(R) of meeting attendees over a predetermined time interval and analyze the historical device usage data 126 to infer the level of productivity of the meeting attendee during the workday time increment of the proposed meeting.

The refined meeting expense may comprise an aggregate of LWT values and weighted LWT values (if available) for the meeting attendees. If the refined meeting expense remains greater than the predetermined meeting expense threshold, the MEV controller may further analyze the meeting request and profile data 110 to determine recommendations that reduce the meeting expense. Recommendations may include changing a meeting format from in-person to virtual, proposing an alternate meeting time, or proposing alternate meeting attendees for a subset of originally invited meeting attendees.

The MEV controller 112 may transmit a notification 124 to the scheduler device 118 indicating whether the meeting request has been suspended or permitted to occur. If suspended, the notification 124 may include selectable options to modify the meeting request based on one or more proposed recommendations (e.g., a change to meeting format, a change to the meeting time, or a change to meeting attendees). In some examples, the notification 124 may include an additional selectable option to notify an authorizing party to permit the meeting to occur despite the refined/meeting expense being greater than a predetermined meeting expense threshold.

Figure 4:
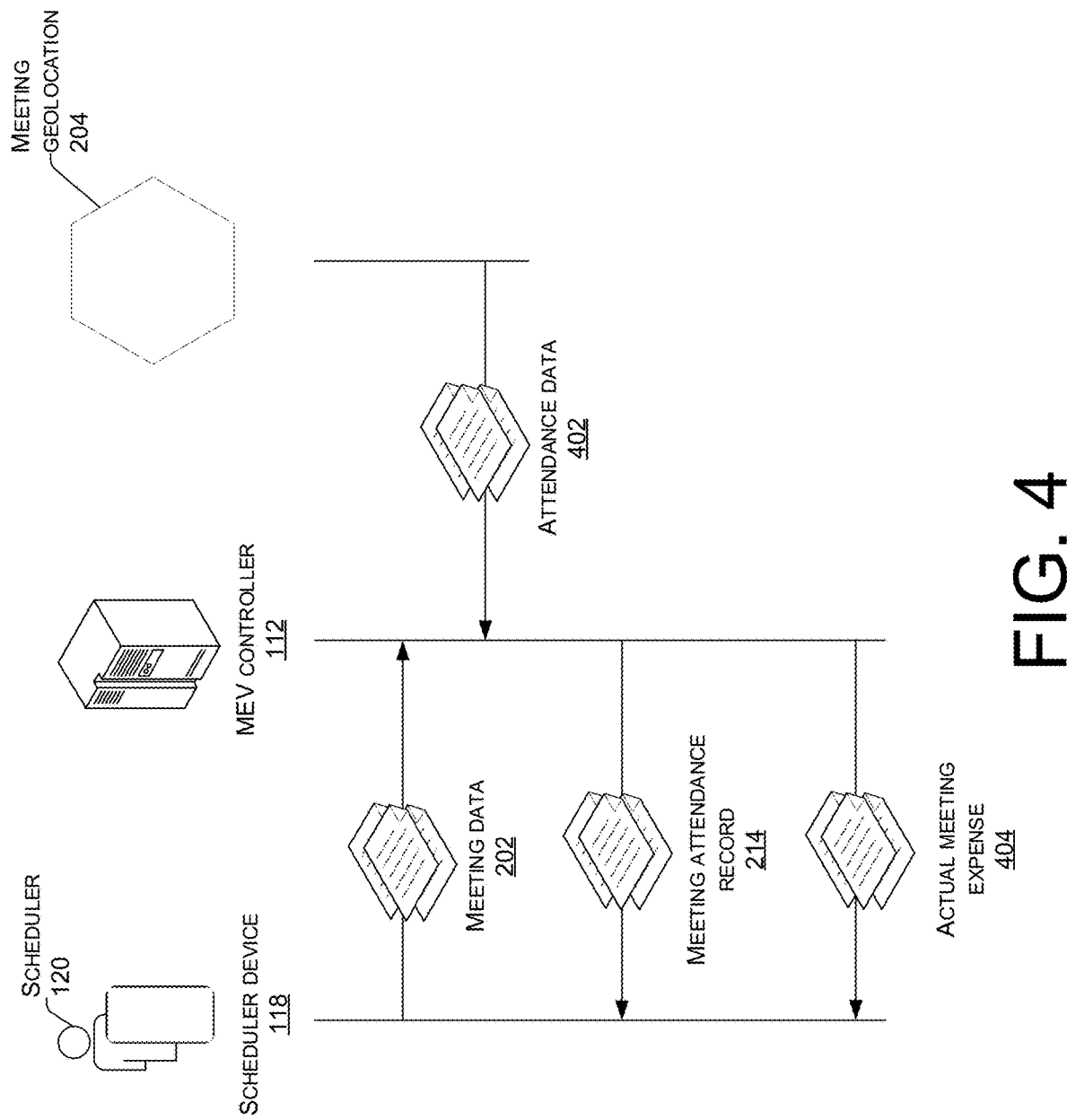
FIG. 4 illustrates a block diagram of an operation of the MEV controller in generating a meeting attendance record based on verifying the presence of meeting attendees, in accordance with at least one embodiment.

FIG. 4 illustrates a block diagram of an operation of the MEV controller in generating a meeting attendance record based on verifying the presence of meeting attendees, in accordance with at least one embodiment. The MEV controller 112 may receive meeting data 202 from a scheduler device 118 that is associated with a scheduled meeting. The meeting may be an in-person meeting or a virtual meeting.

The MEV controller 112 may analyze the meeting data 202 to identify the meeting attendee(s) 122(1)-122(Q) that are scheduled to attend the scheduling meeting and the meeting location. For an in-person meeting, the meeting location may be a meeting geolocation 204. For a virtual meeting, the meeting location may be a virtual meeting platform.

The MEV controller 112 may capture attendance data 402 during the scheduled meeting. For an in-person meeting, the attendance data 402 may comprise telemetry data 206 and sensor data 212 from the meeting location. Telemetry data 206 may be captured from the attendee device(s) 128(1)-128(R) and network device(s) 208(1)-208(N) at the meeting geolocation 204. Sensor data 212 may be captured from sensors that capture visual data and/or audio data at the meeting geolocation 204. For a virtual meeting, the attendance data 402 may comprise IP address data associated with meeting attendee(s) 122(1)-122(Q) that access the virtual meeting platform.

The MEV controller 112 may analyze the attendance data 402 to infer an identity of the meeting attendee(s) 122(1)-122(Q). The MEV controller 112 may further infer the time spent by each verified meeting attendee at the meeting. In doing so, the MEV controller 112 may generate a meeting attendance record 214 for delivery to the scheduler device 118. The meeting attendance record 214 may include a list of verified meeting attendees and the time spent by each verified meeting attendee at the meeting.

In some examples, the MEV controller 112 may determine an actual meeting expense 404 associated with the meeting. The actual meeting expense 404 may be based on the meeting attendance record and weighted/LWT value of each meeting attendee. The MEV controller 112 may transfer the actual meeting expense 404 to the scheduler device 118.

Figure 5:
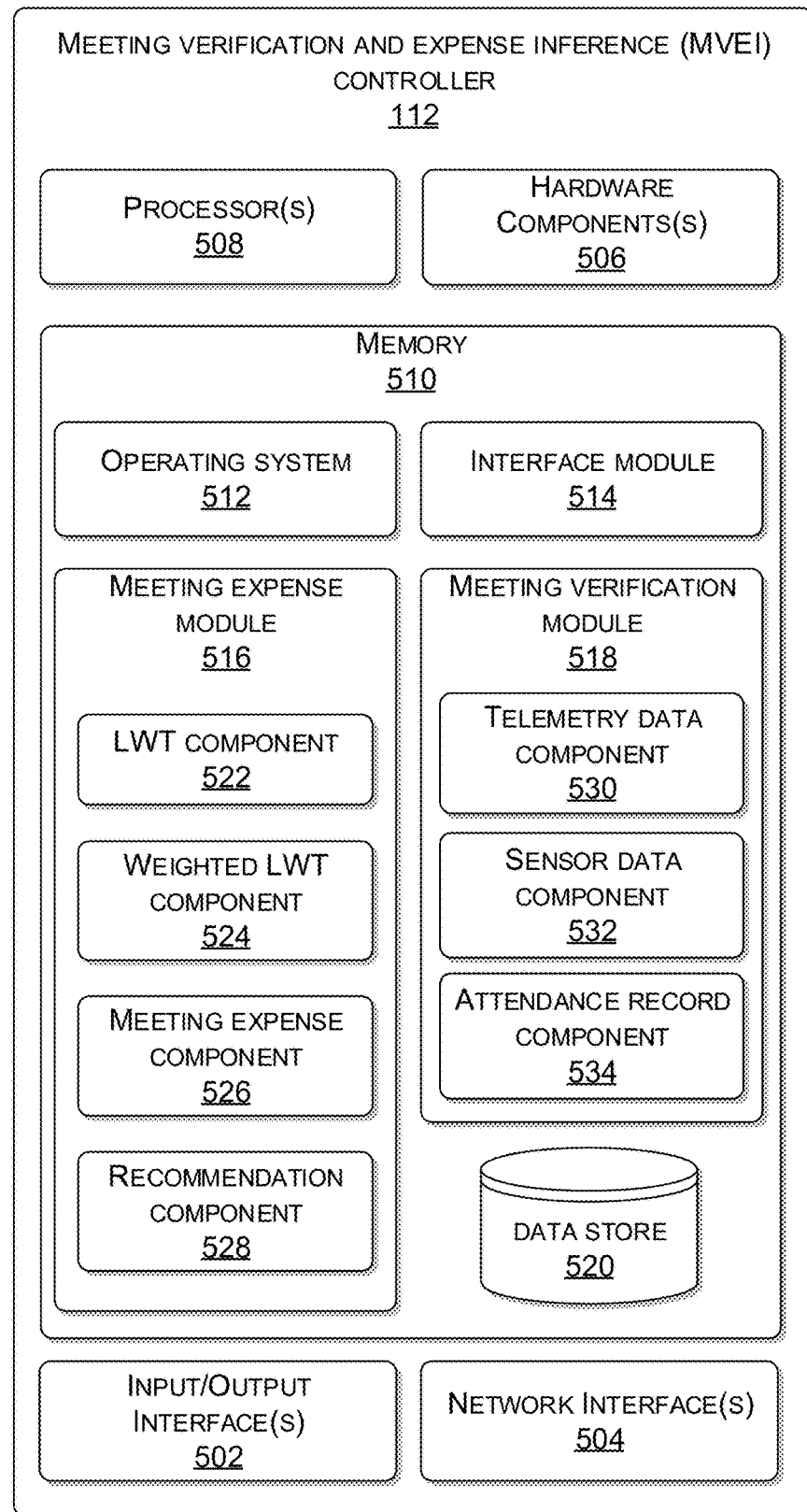
FIG. 5 illustrates various components of an example MEV controller.

FIG. 5 illustrates various components of an example meeting expense and verification (MEV) controller. In the illustrated example, the MEV controller 112 may perform acts to infer the meeting expense of a proposed meeting and verifying meeting attendance at a scheduled in-person or virtual meeting.

The MEV controller 112 may include input/output interface(s) 502. The input/output interface(s) 502 may include any suitable type of output interface known in the art, such as a display (e.g., a liquid crystal display), speakers, a vibrating mechanism, or a tactile feedback mechanism. Input/output interface(s) 502 also includes ports for one or more peripheral devices, such as headphones, peripheral speakers, or a peripheral display. Further, the input/output interface(s) 502 may further include a camera, a microphone, a keyboard/keypad, or a touch-sensitive display. A keyboard/keypad may be a push-button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

Additionally, the MEV controller 112 may include network interface(s) 504. The network interface(s) 504 may include any suitable sort of transceiver known in the art. For example, the network interface(s) 504 may include a radio transceiver that performs the function of transmitting and receiving radio frequency communications via an antenna. Also, the network interface(s) 504 may include a wireless communication transceiver and a near-field antenna for communicating over unlicensed wireless Internet Protocol (IP) networks, such as local wireless data networks and personal area networks (e.g., Bluetooth or near field communication (NFC) networks). Further, the network interface(s) 504 may include wired communication components, such as an Ethernet port or a Universal Serial Bus (USB). Hardware component(s) 506 may include additional hardware interface, data communication hardware, and data storage hardware.

Further, the MEV controller 112 may include one or more processor(s) 508 that are operably connected to memory 510. In at least one example, the one or more processor(s) 508 may be a central processing unit(s) (CPU), graphics processing unit(s) (GPU), or both a CPU and GPU or any suitable sort of processing unit(s). Each of the one or more processor(s) 508 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 508 may also be responsible for executing all computer applications stored in the memory, which can be associated with common types of volatile (RAM) and/or non-volatile (ROM) memory.

In some examples, memory 510 may include system memory, which may be volatile (such as RAM), non-volatile (such as ROM, flash memory, etc.), or some combination of the two. The memory may also include additional data storage devices (removable and/or non-removable) such as, for example, magnetic disks, optical disks, or tape.

The memory 510 may further include non-transitory computer-readable media, such as volatile and nonvolatile, removable, and non-removable media implemented in any suitable method or technology for storage of information, such as computer-readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any suitable non-transitory medium which can be used to store the desired information.

In the illustrated example, the memory 510 may include an operating system 512, an interface module 514, a meeting expense module 516, a meeting verification module 518, and a data store 520. The operating system 512 may be any suitable operating system capable of managing computer hardware and software resources. The operating system 512 may include an interface layer that enables applications to interface with the input/output interface(s) 502 and the network interface(s) 504.

The interface module 514 may be configured to intercept a meeting request generated by a scheduler device within an enterprise network. The meeting request may be intended for meeting attendees within the enterprise network. The meeting request may include, among other things, a plurality of meeting attendees, meeting subject matter, meeting format (e.g., in-person meeting or virtual meeting), and a date and time for the scheduled meeting.

The interface module 514 may also interact with a scheduler device to receive meeting data related to a meeting that has been rescheduled. Unlike a meeting request for a proposed meeting, the meeting data may be used by the meeting verification module 518 to verify attendance of meeting attendees, and by the meeting expense module 516 to calculate an actual meeting expense of the scheduled meeting.

The interface module 514 may also interact with an enterprise server of the enterprise network to retrieve profile data associated with meeting attendees and store the profile data within the data store 520. The interface module 514 may first identify the meeting attendees via the meeting expense module 516 and retrieve the profile data associated with those meeting attendees.

The interface module 514 may interact with an enterprise server of the enterprise network to retrieve historical device usage data associated with attendee devices of meeting attendees. Historical device usage data may include attendee device logs associated with user applications, email, web browsers, and other applications executed via attendee devices. In one embodiment, an enterprise server may capture historical device usage data, and the interface module 514 may retrieve the historical device usage data from the enterprise server. In another embodiment, the interface module 514 may interact with the attendee device(s) of personnel associated with the enterprise network to capture device usage data. The device usage data may be captured continuously or per a predetermined schedule over a predetermined time interval. The predetermined schedule may be based on any suitable time interval, such as one minute, five minutes, or ten minutes. The predetermined time interval may be set by an operator of the MEV controller 112 or administrator of the enterprise network. Upon receipt, the interface module 514 may store the device usage data within the data store 520, as historical device usage data.

The interface module 514 may interact with authorizing party devices for delivery of messages with selectable options to terminate or permit a proposed meeting to occur, based on a meeting expense being greater than a predetermined meeting expense threshold. The interface module 514 may also receive, from the authorizing party devices, a selection to terminate or permit the proposed meeting to occur.

The interface module 514 may also interact with a scheduler device to provide various notifications, such as the suspension of a meeting request and execution of a meeting request. The interface module 514 may also provide the scheduler device with recommendation data associated with a proposed meeting. The recommendation data may include selection options to alter a meeting time, change a meeting format, or substitute meeting attendees. Further, the interface module 514 may also provide the scheduler device with a meeting attendance record of the scheduled meeting that took place. In some examples, the meeting attendance record may include an actualized meeting expense, based on the list of meeting attendees and the meeting format with which they attended.

The meeting expense module 516 may further include an LWT component 522, a weighted LWT component 524, a meeting expense component 526, and a recommendation component 528. The LWT component 522 may be configured to calculate the LWT value associated with each meeting attendee listed on a meeting request. The LWT value may comprise the total work time lost due to attending a meeting multiplied by the meeting attendee's hourly rate. For an in-person meeting, the total work time lost comprises preparatory time, the meeting duration and travel time to and from the meeting geolocation. For a virtual meeting, the total work time lost may comprise preparatory time and the meeting duration. The LWT component 522 may retrieve profile data associated with each meeting attendee from the data store 520. The profile data may include an hourly rate that can be used to calculate the LWT value for each meeting attendee.

In some examples, the LWT component 522 may generate a data model to infer the LWT value for virtual meetings and in-person meetings. The MEV controller may retrieve, from the data store 520, historical profile data (e.g., historical calendar data) associated with each meeting attendee and historical monitored location data associated with the meeting location of in-person meetings. The historical profile data may be used to infer a location of each meeting attendee prior to a scheduled meeting. The historical profile data may also be used to infer time lost for preparing meeting content and setting up the virtual or in-person meeting. For a virtual meeting, preparatory time may include the time historically taken to perform internet connection checks, microphone checks, and headset troubleshooting checks. For an in-person meeting, preparatory time may also include the time historically taken to setup visual aids at the meeting location.

The historical monitored location data may be used to infer environmental factors that may impact the travel time from the location of each meeting attendee to the meeting location. Environmental factors may include, without limitation, historical vehicle parking availability at the meeting location, walking distance from a vehicle parking location to the meeting location, and historical public-road traffic conditions en-route to the meeting location.

Accordingly, the LWT component 522 may correlate a proposed meeting start time and meeting location with data points of the data model to infer a LWT value for each meeting attendee. The LTW component 522 may continuously update the data model as more profile data and monitored meeting location data becomes available. As such, a continuously more accurate data model can be developed.

The weighted LWT component 524 may be configured to calculate a weighted LWT value. The weighted LWT value may comprise the LWT value (e.g., derived by the LWT component 522) multiplied by a productivity fraction. The productivity fraction is a factor multiplied to the hourly rate of a meeting attendee and is intended to reflect the level of productivity of the meeting attendee during a scheduled meeting time. Productivity fractions are calculated for each meeting attendee, and for discrete workday time increments of each meeting attendee's workday. Productivity fractions may be expressed as a fraction of one (1). A productivity fraction of 1.0 may reflect a maximum level of productivity, 0.1 may represent 10% productivity, and zero may represent no productivity.

To calculate the productivity fraction, the weighted LWT component 524 may retrieve, from the data store 520, historical device usage data associated with meeting attendees of the proposed meeting. Further, the weighted LWT component 524 may employ one or more trained machine-learning algorithms to analyze the historical device usage data relative to discrete workday time increments to determine a level of workday productivity for each workday time increment. For example, if the weighted LWT component 524 infers, following an analysis of historical data usage, that a meeting attendee is typically browsing the internet during a workday time increment allotted for a scheduled meeting, then the productivity fraction for that discrete workday time increment may be low (e.g., a productivity fraction less than or equal to 0.3). However, if the meeting attendee is typically executing work-related user applications during the workday time incremented allotted for the scheduled meeting, the productivity fraction for that discrete workday time increment may be high (e.g., a productivity fraction greater than 0.7).

Accordingly, the weighted LWT component 524 may calculate a weighted LWT value as a product of the LWT value and the productivity fraction. By using the weighted LWT value in place of the LWT value when calculating meeting expense, the meeting expense associated with an individual may, at best, remain unchanged (e.g., productivity fraction equal to one), but is more likely to reduce relative to an inferred level of productivity that is less than or equal to 100%.

In some examples, the weighted LWT component 524 may calculate a weighted LWT value for particular meeting attendees based on an indication from the LWT component 522 that the LWT value for the particular meeting attendees is greater than a predetermined LWT threshold. The predetermined LWT threshold may be set by an operator of the MEV controller 112 or an administrator of the enterprise network 104. Alternatively, or additionally, the weighted LWT component 524 may calculate a weighted LWT value for substantially all meeting attendees, or for a subset of high-value meeting attendees (e.g., meeting attendees with a high LWT value relative to other meeting attendees), based on the meeting expense of a proposed meeting being greater than a predetermined meeting expense threshold.

The meeting expense component 526 may calculate a meeting expense associated with a proposed meeting. The meeting expense may be based on an aggregate of LWT values or weighted LTW values (if, available) for each meeting attendee. Further, the meeting expense component 526 may determine whether a proposed meeting is to occur based at least in part on the meeting expense. For example, if the meeting expense is less than or equal to a predetermined meeting expense threshold, the meeting expense component 526 may permit the meet request to occur. Alternatively, if the meeting expense component 526 determines that the meeting expense is greater than the predetermined meeting expense threshold, the proposed meeting may be suspended, and the meeting expense component 526 may perform one or several actions. If weighted LWT values have not been incorporated as part of the meeting expense calculation, the meeting expense component 526 may interact with the weighted LWT component 524 to calculate weighted LWT values. If, after incorporating the weighted LWT values into the meeting expense, the meeting expense remains greater than the predetermined meeting expense threshold, the meeting expense component 526 may interact with the recommendation component 528 to provide recommendations for the proposed meeting.

Moreover, the meeting expense component 526 may interact with the meeting verification module 518 to determine an actual meeting expense associated with a scheduled meeting that took place. The meeting expense may be based on the weighted/LWT value associated with the time spent by each verified meeting attendee at the meeting.

The recommendation component 528 may be configured to perform one of several actions in response to receiving an indication from the meeting expense component 526 that the meeting expense is greater than a predetermined meeting expense threshold. The recommendation component 528 may identify an authorizing party, via profile data, with credentials to approve the meeting request despite the meeting expense exceeding the predetermined meeting expense threshold. In doing so, the recommendation component 528 may generate a message for delivery to an authorizing party device that indicates that the meeting request has been suspended due to the meeting expense being greater than the predetermined meeting expense threshold. The message may further include at least two selectable options, namely, to confirm the meeting request suspension, which terminates the meeting request, and to approve the meeting request, which permits the proposed meeting to occur. The recommendation component 528 may selectively terminate the meeting request or permit the proposed meeting to occur, based on receipt of a selection from the authorizing party device.

The recommendation component 528 may also analyze the meeting request to recommend changes to the proposed meeting that may lower the meeting expense to at least the predetermined meeting expense threshold. In one example, the recommendation component 528 may recommend an alternate meeting time for the proposed meeting. For example, the recommendation component 528 may analyze weighted LWT values associated with the original meeting time to identify high-value meeting attendees (e.g., meeting attendees with a high weighted LWT value relative to other meeting attendees). In doing so, the recommendation component 528 may further analyze historical data usage associated with the high-value meeting attendees to identify a workday time increment that yields lower weighted LWT values (e.g., lower productivity fractions) relative to the weighted LWT values associated with the original meeting time. The recommendation component 528 may recommend the workday time increment that yields the lower weighted LWT values as an alternate meeting time.

In another example, the recommendation component 528 may recommend an alternate meeting attendee to replace high-value meeting attendees (e.g., meeting attendees with a high weighted LWT value relative to other meeting attendees). The recommendation component 528 may analyze the meeting request to identify a meeting subject matter. The recommendation component 528 may further analyze profile data of high-value meeting attendees along with other suitable personnel of the organization, to identify colleagues or supervisees of the high-value meeting attendees that belong to a workgroup related to the meeting subject matter. From the pool of colleagues and supervisees identified, the recommendation component 528 may identify a subset of colleagues and supervisees as alternate meeting attendees, based on the relevance of their respective profile data to the meeting subject matter. The selection of alternate meeting attendees may be based on their inferred lower weighted/LWT value relative to that of the high-value meeting attendees.

In yet another example, the recommendation component 528 may recommend a change in meeting format from an in-person meeting to a virtual meeting, for a subset, or all, meeting attendees. For an in-person meeting, the recommendation component 528 may identify a travel component of the weighted/LWT value for each meeting attendee that is associated with travel to and from the proposed meeting location. If the travel component of the weighted/LWT value is greater than a predetermined travel value threshold, the recommendation component 528 may recommend a change in meeting format for those meeting attendees.

In yet another example, the recommendation component 528 may recommend a change in meeting format from a virtual meeting to an in-person meeting, for a subset, or all, meeting attendees. In this example, the recommendation component 528 may infer from data captured by the telemetry data component 530 that virtual meeting connectivity is below a predetermined QoS threshold. The QoS threshold may be set by a meeting organizer or an administrator of the MEV controller 112. In doing so, the recommendation component 528 may recommend the change in meeting format for those meeting attendees.

Moreover, the recommendation component 528 may aggregate the travel component of the weighted/LWT values for each meeting attendee to generate a travel meeting expense for the proposed meeting. If the travel meeting expense is greater than a predetermined travel expense threshold, the recommendation component 528 may recommend a change in meeting format from an in-person meeting to a virtual meeting. The change in meeting format may impact a subset, or substantially all meeting attendees, so as to reduce the travel meeting expense to less than or equal to the predetermined travel expense threshold.

The predetermined travel expense threshold and the predetermined travel value threshold may be set by an operator of the MEV controller or an administrator of the organization within which the MEV controller operates.

The meeting verification module 518 may further include a telemetry data component 530, a sensor data component 532, and an attendance record component 534. The telemetry data component 530 may perform acts to detect the attendance of meeting attendees during a scheduled in-person and virtual meeting. For an in-person meeting, the telemetry data component 530 may identify attendee devices based on the profile data of each meeting attendee and retrieve telemetry data from the attendee devices during the scheduled meeting. The profile data may be retrieved from the data store 520. The telemetry data component 530 may also interact with network devices located at the geolocation of an in-person meeting. The telemetry data from each attendee device and each network device may include electronic handshake data, a timestamp, date-stamp, device identifier, and corresponding geolocation.

For a virtual meeting, the telemetry data component 530 may interact with a virtual meeting platform to capture authentication data associated with meeting attendees. Authentication data may include, without limitation, IP address data, personal hardware device identifiers, login credentials, authentication tokens, authorization tokens, or any combination thereof. Meeting attendees may be verified by comparing the authentication data to authentication data retrieved from the profile data of each meeting attendee.

The telemetry data component 530 may infer the identity of meeting attendees based on an analysis of the telemetry data, sensor data, and IP address data, relative to the profile data of each attendee. The profile data may include a listing of device identifiers, and IP addresses associated with each meeting attendee.

The telemetry data component 530 may retrieve telemetry data from attendee devices and network devices, and IP address data from a virtual meeting platform, continuously, or per a predetermined schedule. The predetermined schedule may be based on any suitable time interval, such as one minute, five minutes, or ten minutes. By capturing telemetry data (e.g., in-person meeting) and IP address data (e.g., virtual meeting) throughout the scheduled meeting, the telemetry data component 530 may determine whether meeting attendees attended the scheduled meeting in its entirety or only a portion of the scheduled meeting. For example, a meeting attendee may arrive late, leave early, or briefly step out of the scheduled meeting. In some examples, the telemetry data component 530 may capture quality of service (QoS) data relating to connectivity of the meeting attendee's device to the virtual meeting. QoS data may downlink throughput, uplink throughput, packet loss, latency, jitter, echo, or any suitable combination thereof. In doing so, the telemetry data component 530 may calculate a QoS value associated with connectivity of each meeting attendee device to the virtual meeting platform. The QoS value may be used by the recommendation component 528 to determine whether to recommend a change in meeting format for meeting attendees that experience a QoS value that is less than a predetermined QoS threshold.

The sensor data component 532 may be configured to interact with sensors located at a geolocation of a scheduled in-person meeting. The sensor data component 532 may capture sensor data that includes visual data, audio data, or a suitable combination of both. The sensor data component 532 may analyze the sensor data to verify the attendance of meeting attendees. For example, the sensor data component 532 may retrieve registered biometric profiles of each meeting attendee for the profile data within the data store 520. The sensor data component 532 may employ one or more machine-learning algorithms to analyze the sensor data relative to the registered biometric profiles to infer the identity of the meeting attendees. The sensor data component 532 may capture the sensor data continuously during the scheduled meeting or per a predetermined schedule. The predetermined schedule may be based on any suitable time interval, such as one minute, five minutes, or ten minutes. By capturing the sensor data throughout the scheduled meeting, the sensor data component 532 may determine whether the meeting attendee was present for the duration of the scheduled meeting, or a portion of the scheduled meeting.

The attendance record component 534 may be configured to generate a meeting attendance record. For an in-person meeting, the meeting attendance record may be based on the telemetry data and sensor data. For a virtual meeting, the meeting attendance record may be based on IP address data captured from the virtual meeting platform. The meeting attendance record may include a list of verified meeting attendees and the time spent by each verified meeting attendee at the meeting.

The data store 520 may be configured to store profile data, historical device usage data relating to personnel associated with an enterprise network, and any suitable data pertinent to an operation of the MEV controller 112.

The MEV controller 112, via various modules and components, may make use of one or more trained machine-learning algorithms such as supervised learning, unsupervised learning, semi-supervised learning, naive Bayes, Bayesian network, decision trees, neural networks, fuzzy logic models, and/or probabilistic classification models.

FIGS. 6, 7, 8, 9 present processes 600, 700, 800, and 900 that relate to operations of the MEV controller 112. Each of processes 600, 700, 800, and 900 illustrate a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600, 700, 800, and 900 are described with reference to the computing environment 100 of FIG. 1.

Figure 6:
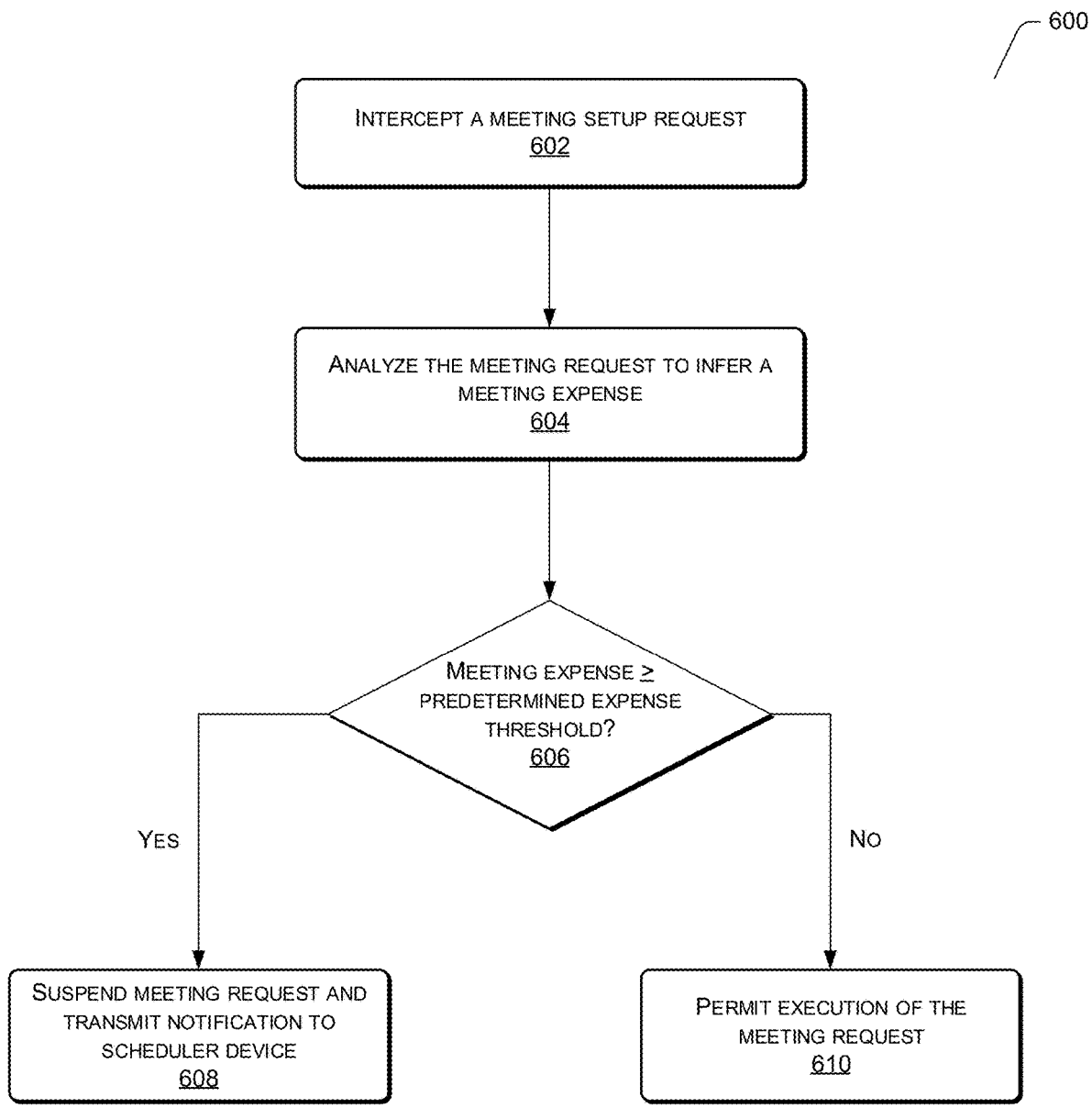
FIG. 6 illustrates an exemplary process for determining whether to suspend or permit a proposed meeting request to occur based on an inferred meeting expense.

FIG. 6 illustrates an exemplary process for determining whether to suspend or permit a proposed meeting request to occur based on an inferred meeting expense. The proposed meeting may include meeting attendees that are associated with an enterprise network of an organization. Process 600 is described from the perspective of the MEV controller 112. The MEV controller 112 may reside in the enterprise network or interact with the enterprise network via one or more network(s).

At 602, the MEV controller may intercept, from a scheduler device, a meeting request for a proposed meeting. The meeting request may include a meeting time, meeting duration, meeting format (e.g., virtual meeting, in-person meeting, or a suitable combination of both), meeting subject matter, and a list of attendees.

At 604, the MEV controller may analyze the meeting request to infer a meeting expense for the proposed meeting. The meeting expense may comprise an aggregate of LWT values or weighted LWT values (if available) for meeting attendees at the meeting time of the proposed meeting.

At 606, the MEV controller may determine whether the meeting expense is greater than a predetermined expense threshold. The predetermined expense threshold may be set by an operator of the MEV controller or administrator of the enterprise network. If the MEV controller determines that the meeting expense is greater than the predetermined expense threshold, process 600 may proceed to block 608. Accordingly, at block 608, the MEV controller may suspend executing the meeting request. The MEV controller may transmit a notification to the scheduler device indicating the same.

Otherwise, if the MEV controller determines that the meeting expense is less than or equal to the predetermined expense threshold, process 600 may proceed to block 610. At 610, the MEV controller may permit the execution of the meeting request. The MEV controller may transmit a notification to the scheduler device indicating the same.

Figure 7:
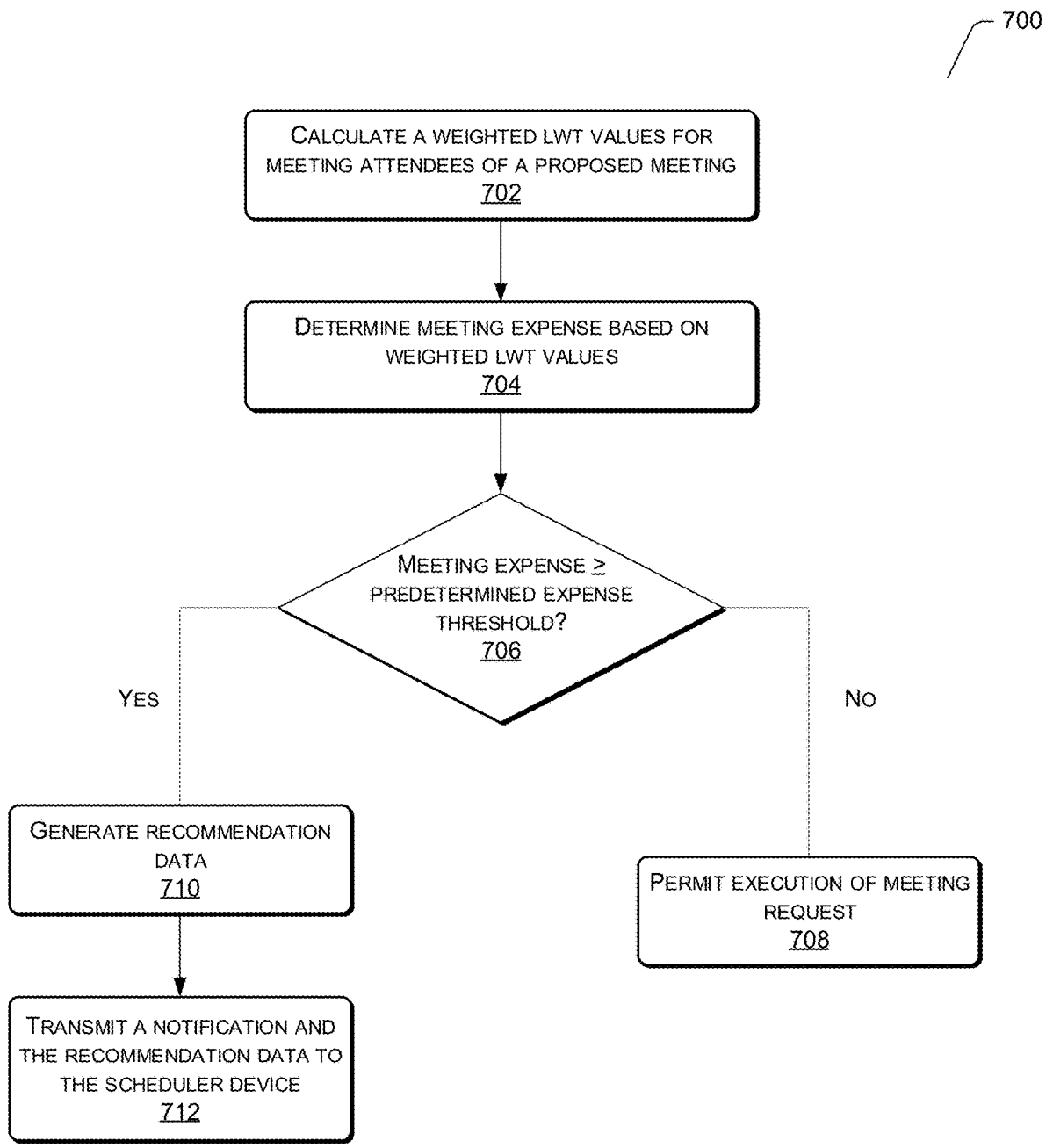
FIG. 7 illustrates an exemplary process for refining a meeting expense analysis of a proposed meeting and, in some instances, providing recommendation data to reduce the meeting expense of a proposed meeting.

FIG. 7 illustrates an exemplary process for refining a meeting expense analysis of a proposed meeting and, in some instances, providing recommendation data to reduce the meeting expense of a proposed meeting. Process 700 presupposes an initial meeting expense calculation that is greater than a predetermined meeting expense threshold. Accordingly, process 700 continues from block 608 of process 600, whereby the MEV controller suspended executing the meeting request. Process 700 is described from the perspective of the MEV controller.

At 702, the MEV controller may calculate a weighted LWT value for a subset, or substantially all, meeting attendees of the proposed meeting. The weighted LWT value may comprise a productivity fraction multiplied by an LWT value. The LWT value may comprise an hourly rate of the meeting attendee multiplied by the time lost due to the proposed meeting. For an in-person meeting, time lost includes travel time to and from the proposed meeting location. The productivity fraction accounts for an inferred level of productivity of a meeting attendee that is typically exhibited during the scheduled meeting time.

The MEV controller may calculate a weighted LWT value for meeting attendees with an LWT that is greater than a predetermined LWT threshold. Alternatively, or additionally, the MEV controller may calculate a weighted LWT value for substantially all meeting attendees, or a subset of high-value meeting attendees (e.g., meeting attendees with a high LWT value relative to other meeting attendees), based on the meeting expense of a proposed meeting being greater than a predetermined meeting expense threshold.

At 704, the MEV controller may calculate a refined meeting expense based on the calculated weighted LWT values. The refined meeting expense may comprise weighted LWT values for substantially all meeting attendees or combine LWT values for some meeting attendees with weighted LWT values for other meeting attendees.

At 706, the MEV controller may determine whether the refined meeting expense is greater than the predetermined meeting expense threshold. If the MEV controller determines that the refined meeting expense is less than or equal to the predetermined meeting expense threshold, process 700 may proceed to block 708. At 708, the MEV controller may permit the execution of the meeting request.

Otherwise, if the MEV controller determines that the refined meeting expense is less than or equal to the predetermined meeting expense threshold, process 700 may proceed to block 710. At 710, the MEV controller may generate a recommendation data to support the execution of the meeting request. In one example, the MEV controller may identify an authorizing party with credentials to approve the meeting request, despite the refined/meeting expense. In doing so, the MEV controller may generate a message for delivery to an authorizing party device that includes selectable options to confirm the meeting request suspension, which terminates the meeting request or to approve the meeting request, which permits the proposed meeting to occur, unaltered.

In another example, the MEV controller may analyze the weighted LWT values of a subset of meeting attendees to select an alternate meeting time that would reduce the meeting expense to at least the meeting expense threshold. The reduction in meeting expense would be generated by identifying a workday time increment that yields a lower productivity fraction of the subset of meeting attendees, relative to the productivity fraction at the original meeting time of the proposed meeting.

In yet another example, the MEV controller may analyze profile data of the meeting attendees, along with other suitable personnel of the organization, to identify colleagues or supervisees that may act as alternate meeting attendees. The selection of alternate meeting attendees may be based at least in part on their inferred lower weighted/LWT value relative to that of the high-value meeting attendees.

For in-person meetings, the MEV controller may also recommend a change in meeting format to virtual meetings based on the travel component of the weighted/LWT values being greater than a predetermined travel value threshold. The change in meeting format may be recommended for substantially all meeting attendees, or a subset of meeting attendees.

At 712, the MEV controller may transmit a notification to the scheduler device along with the recommendation data. The notification may include selectable options based on the recommendation data. For example, the selectable options may relate to altering a meeting time, changing a meeting format, or substituting one meeting attendee for another.

Figure 8:
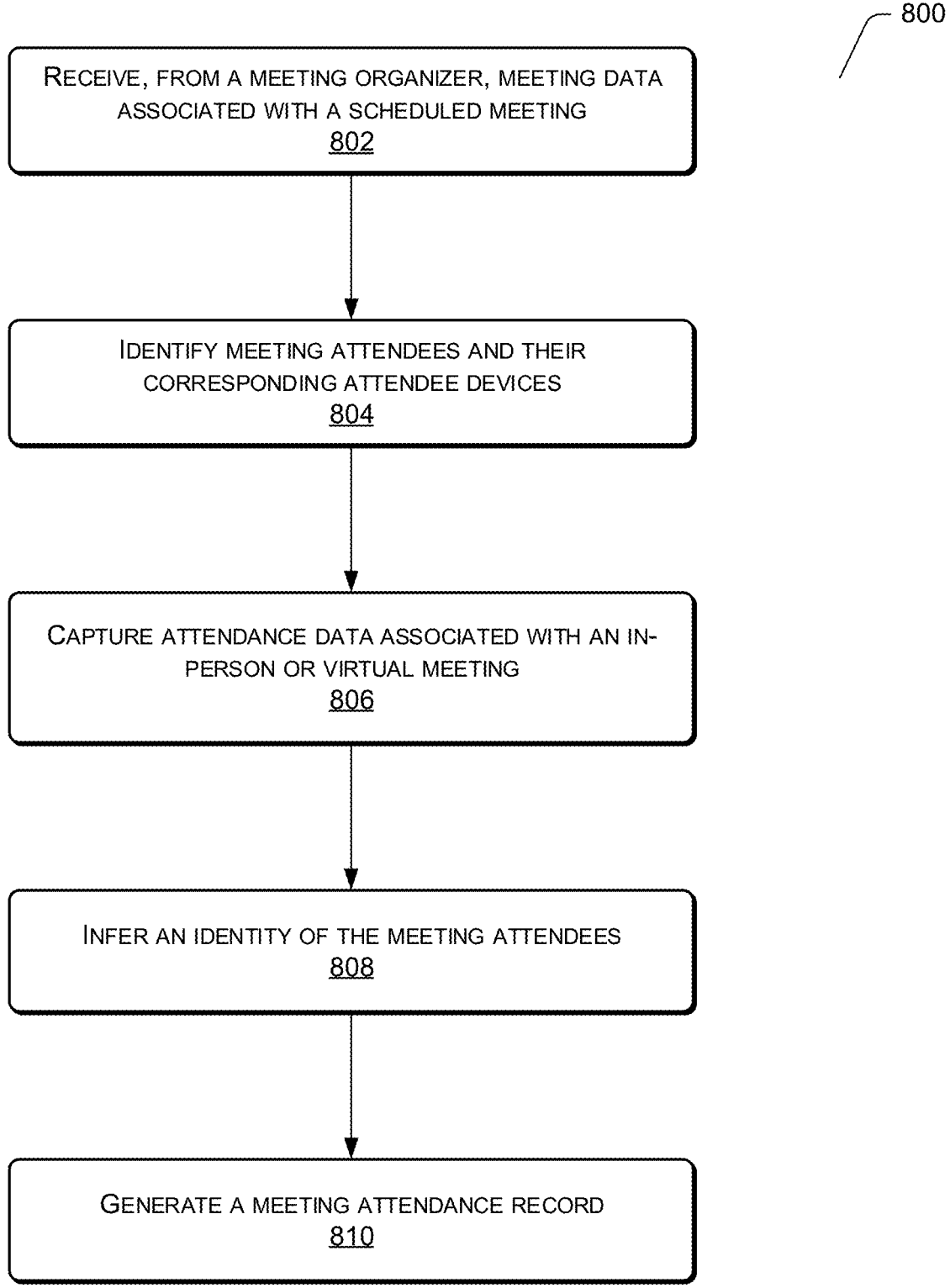
FIG. 8 illustrates an exemplary process for generating a meeting attendance record based on verifying the presence of meeting attendees during a scheduled meeting.

FIG. 8 illustrates an exemplary process for generating a meeting attendance record based on verifying the presence of meeting attendees during a scheduled meeting. The meeting attendees and scheduled meeting may be associated with an enterprise network of an organization. Process 800 is described from the perspective of the MEV controller and analyzes the meeting attendance of in-person and virtual meetings during the scheduled meeting.

At 802, the MEV controller may receive, from a scheduler device, meeting data associated with a scheduled meeting occurring at a scheduled meeting location and a scheduled meeting time. The scheduled meeting may be an in-person meeting or a virtual meeting. For a virtual meeting, the meeting location is a virtual meeting platform. For an in-person meeting, the meeting format is the geographic location of the meeting.

At 804, the MEV controller may identify meeting attendees of the scheduled meeting and their corresponding attendee devices. The MEV controller may identify the meeting attendees based on the meeting data received from the scheduler device. Further, the MEV controller may retrieve profile data associated with each meeting attendee from an enterprise server of the enterprise network, and further, identify attendee devices associated with each of the meeting attendees from the profile data.

At 806, the MEV controller may capture attendance data from the geolocation of an in-person meeting or a virtual meeting platform of a virtual meeting. For an in-person meeting, the attendance data may comprise telemetry data and sensor data from the meeting geolocation. The MEV controller may capture telemetry data from attendee devices and network devices at the meeting geolocation. Sensor data may be captured from sensors that capture visual data, audio data, or a suitable combination of both, at the meeting geolocation. For a virtual meeting, the attendance data may comprise IP address data associated with meeting attendees that access the virtual meeting platform.

Attendance data may be captured throughout the scheduled meeting to determine whether meeting attendees were present for the duration of the scheduled meeting, or a portion of the scheduled meeting.

At 808, the MEV controller may infer an identity of the meeting attendees based on the telemetry data, sensor data, and IP address data. For verification, the MEV controller may rely on profile data captured from an enterprise server of the enterprise network. For example, the profile data may include a listing of device identifiers, registered biometric profiles, and IP addresses for each meeting attendee.

At 810, the MEV controller may generate a meeting attendance record based on the inferred identity of meeting attendees. The meeting attendance record may include a list of verified meeting attendees and the time spent by each verified meeting attendee at the meeting.

Figure 9:
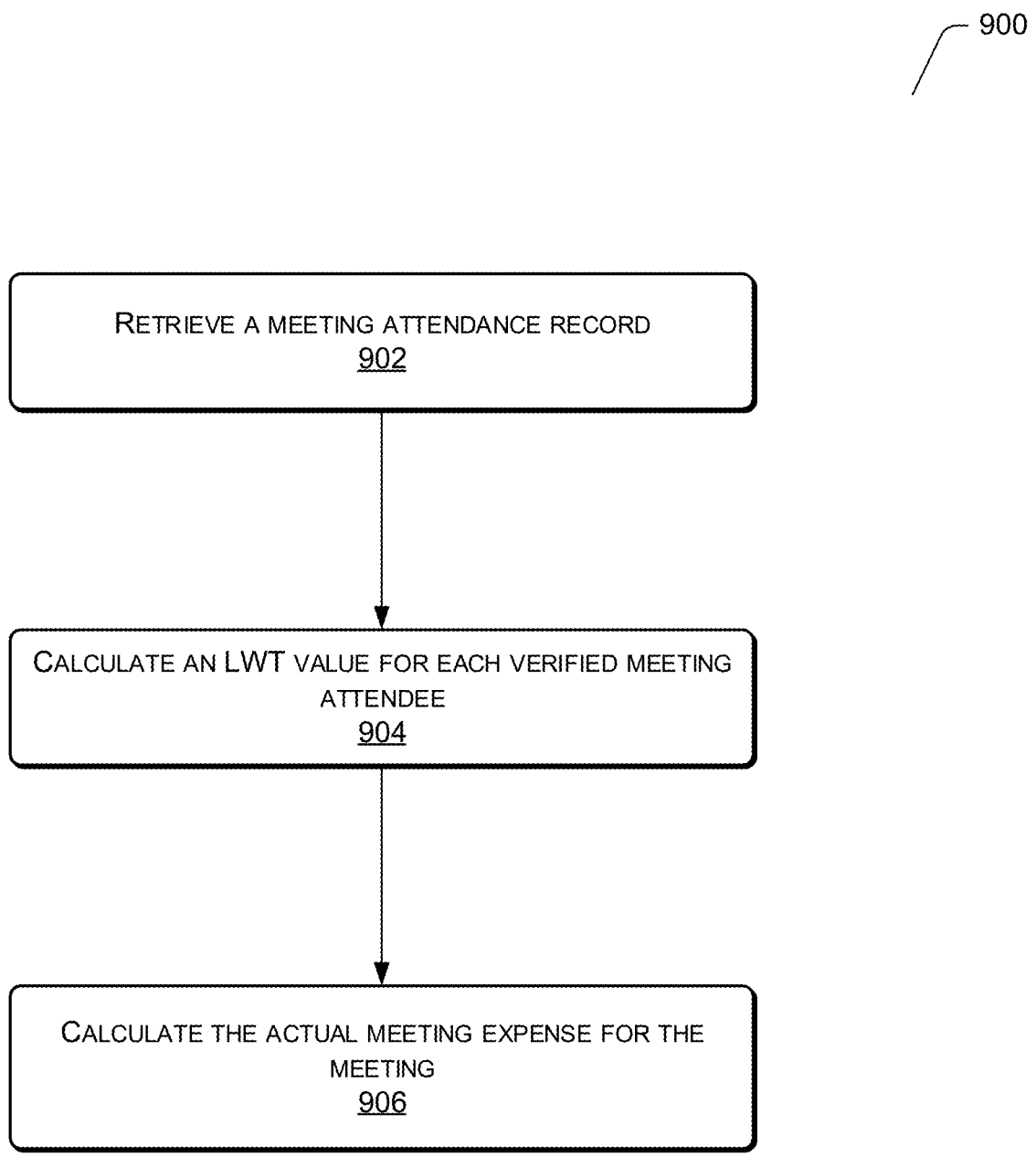
FIG. 9 illustrates an exemplary process to calculate an actual meeting expense of a scheduled meeting that has occurred.

FIG. 9 illustrates an exemplary process to calculate an actual meeting expense of a scheduled meeting that has occurred. Process 900 presupposes that the scheduled meeting has occurred and that a meeting attendance record has been generated, in accordance with process 800. Process 900 is described from the perspective of the MEV controller.

At 902, the MEV controller may retrieve a meeting attendance record associated with a scheduled meeting that has occurred. The meeting attendance record may include a list of verified meeting attendees and the time spent by each verified meeting attendee at the meeting.

At 904, the MEV controller may calculate an LWT value of each of the verified meeting attendees based on the actual time spent by each of the verified meeting attendees at the meeting. The LWT value may comprise an hourly rate of the meeting attendee multiplied by the time spent attending the meeting. In some examples, the MEV controller may calculate a weighted LWT value, which corresponds to the LWT value multiplied by a productivity fraction. The productivity fraction accounts for an inferred level of productivity of a meeting attendee that is typically exhibited during the scheduled meeting time.

At 906, the MEV controller may calculate the actual meeting expense for the meeting. The actual meeting expense may comprise an aggregate of LWT values or weighted LWT values (if available) for meeting attendees that attended the meeting.

Conclusion

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system, comprising:
one or more processors; and
memory coupled to the one or more processors, the memory including one or more modules that are executable by the one or more processors to perform operations to infer a meeting expense for a proposed meeting, calculate an actual meeting expense for an actual meeting, and recommend a change in meeting format, the operations to infer a meeting expense comprising:
intercepting, from a scheduler device, a meeting request for a proposed meeting of in-person meeting attendees at a first meeting location, wherein the first meeting location is a geolocation;
inferring a meeting expense for the proposed meeting based at least in part on the meeting request, wherein an inferring of the meeting expense includes:
determining time lost due to travel of the in-person meeting attendees to the first meeting location that contributes to lost work time (LWT) values of the in-person meeting attendees, the determining the time lost being performed at least using one or more trained machine-learning algorithms to infer a start location of each individual in-person meeting attendee, the machine-learning algorithms having been trained on historical calendar data of the each individual in-person meeting attendee and environmental factors that historically impact meeting at the first meeting location; and
in response to the inferred meeting expense being greater than a predetermined meeting expense threshold, suspending the meeting request, and
the operations to calculate an actual meeting expense for an actual meeting comprising:
for in-person meeting attendees attending the actual meeting at a meeting site:
interacting with sensors located at the meeting site to capture sensor data that includes video from the in-person meeting attendees during the meeting;
analyzing the sensor data, including comparing the sensor data to biometric profile data of the in-person meeting attendees, to identify in-person meeting attendees based on the comparison; and
determining an actual expense of the identified in-person meeting attendees based on their respective LWT values;
for virtual meeting attendees attending the meeting virtually via a virtual meeting platform:
interacting with the virtual meeting platform to capture attendance data that comprises Internet Protocol (IP) addresses associated with the virtual meeting attendees;
identifying the virtual meeting attendees from the IP addresses in the attendance data;
determining, based on historical profile data of the virtual meeting attendees identified in the attendance data, an expense of setting up the virtual meeting at a second meeting location for the virtual meeting attendees that contributes to LWT values of the virtual meeting attendees; and determining an actual expense of the virtual meeting attendees based on their respective LWT values; and calculating the actual meeting expense by aggregating the actual expense of the in-person meeting attendees and the actual expense of the virtual meeting attendees; and the operations to recommend a change in meeting format comprising:

sensing virtual meeting connectivity of the virtual meeting attendees to the actual meeting;

receiving telemetry data that indicates Quality of Service (QOS) of the virtual meeting connectivity; and recommending a change in meeting format from a virtual meeting to an in-person meeting for at least a subset of the virtual meeting attendees based on the telemetry data indicating that virtual meeting connectivity for the at least a subset of the virtual meeting attendees is below a predetermined QoS threshold.

2. The system of claim 1, wherein the one or more modules are further executable by the one or more processors to:

retrieve, from an enterprise server, the biometric profile data associated with individual in-person meeting attendees.

3. The system of claim 1, wherein the proposed meeting is scheduled to occur at a proposed meeting time, and wherein the one or more modules are further executable by the one or more processors to:

retrieve, from an enterprise server, an individual profile associated with a particular in-person meeting attendee of the proposed meeting;

determine an individual LWT value associated with the particular in-person meeting attendee at the proposed meeting time; and in response to the individual LWT value being greater than the predetermined meeting expense threshold, determine an alternate meeting time to replace the proposed meeting time, based at least in part on the individual LWT value.

4. The system of claim 3, wherein the one or more modules are further executable by the one or more processors to:

retrieve, from the enterprise server, historical device usage data associated with the particular in-person meeting attendee over a predetermined time interval;

analyze the historical device usage data to assign an effective worktime value to workday time increments; and generate a data profile for the particular in-person meeting attendee, based at least in part on the worktime value assigned to the workday time increments, wherein to determine the alternate meeting time is further based at least in part on the data profile.

5. The system of claim 4, wherein the one or more modules are further executable by the one or more processors to:

determine the alternate meeting time to occur during a workday time increment with an assigned worktime value that is less than or equal to remaining workday time increments.

6. The system of claim 1, wherein the one or more modules are further executable by the one or more processors to:

retrieve, from an enterprise server, a meeting attendee profile associated with a particular in-person meeting attendee of the proposed meeting;

determine an expense projection associated with the particular in-person meeting attendee at a proposed meeting time of the proposed meeting; and based on the expense projection being greater than the predetermined meeting expense threshold, identify an alternate meeting attendee to attend the proposed meeting in place of the particular in-person meeting attendee.

7. The system of claim 6, wherein the one or more modules are further executable by the one or more processors to:

analyze the meeting attendee profile to identify a plurality of supervised individuals that report to the particular in-person meeting attendee; and determine an alternate expense projection for individual ones of the plurality of supervised individuals, wherein the alternate meeting attendee corresponds to one of the plurality of supervised individuals, based at least in part on the alternate expense projection.

8. The system of claim 1, wherein the one or more modules are further executable by the one or more processors to:

retrieve, from an enterprise server, a meeting attendee profile associated with a particular in-person meeting attendee of the proposed meeting;

parse the meeting request to identify a meeting subject-matter;

analyze the meeting attendee profile to identify a workgroup related to the meeting subject-matter; and identify a plurality of members of the workgroup to attend the proposed meeting as alternate meeting attendees, based at least in part on the meeting subject-matter.

9. The system of claim 8, wherein the one or more modules are further executable by the one or more processors to:

determine an alternate expense projection for individual ones of the plurality of members, and wherein, the alternate meeting attendee corresponds to one of the plurality of members, based at least in part on the alternate expense projection.

10. The system of claim 1, wherein the environmental factors include at least one of a vehicle parking availability at the first meeting location, walking distance from a vehicle parking location to the first meeting location, or public road traffic conditions en route to the first meeting location.

11. The system of claim 1, wherein the one or more trained machine-learning algorithms include a supervised learning algorithm, an unsupervised learning algorithm, a semi-supervised learning algorithm, a naive Bayes algorithm, a Bayesian network algorithm, a decision tree algorithm, a neural network algorithm, a fuzzy logic model algorithm, or a probabilistic classification model algorithm.

12. A computer-implemented method performed under control of one or more processors, comprising:

inferring a meeting expense for a proposed meeting;

calculating an actual meeting expense for an actual meeting; and recommending a change in meeting format, the inferring of a meeting expense comprising:

intercepting, from a scheduler device, a meeting request for a proposed meeting of in-person meeting attendees at a first meeting location, wherein the first meeting location is a geolocation;

determining respective LWT values for the in-person meeting attendees, wherein the determining of respective LWT values includes determining time lost due to travel of the corresponding in-person meeting attendees to the first meeting location that contributes to the respective LWT value, the determining of the time lost being performed at least using one or more trained machine-learning algorithms to infer respective start locations of the in-person meeting attendees, the machine-learning algorithms having been trained on historical calendar data of the in-person meeting attendees and environmental factors that historically impact meeting at the first meeting location; and in response to the inferred meeting expense being greater than a predetermined meeting expense threshold, suspending the meeting, and the calculating of an actual meeting expense comprising, during a meeting of in-person attendees attending in person and virtual attendees attending virtually via a virtual meeting platform:

interacting with sensors located at the meeting site to capture sensor data that includes video from the in-person meeting attendees during the meeting;

analyzing the sensor data, including comparing the sensor data to biometric profile data of the in-person meeting attendees, to identify the in-person meeting attendees based on the comparison; and determining an actual expense of the identified in-person meeting attendees based on their respective LWT values; and for the virtual meeting attendees:

interacting with the virtual meeting platform to capture attendance data that comprises respective Internet Protocol (IP) addresses associated with the virtual meeting attendees;

identifying the virtual meeting attendees from the IP addresses in the attendance data; and determining an expense of setting up the virtual meeting at a second meeting location for the virtual meeting attendees that contributes to LWT values of the virtual meeting attendees identified in the attendance data; and determining an actual expense of the virtual meeting attendees based on their respective LWT values; and calculating the actual meeting expense by aggregating the actual expense of the in-person meeting attendees and the actual expense of the virtual meeting attendees; and the operations to recommend a change in meeting format comprising:

sensing virtual meeting connectivity of the virtual meeting attendees to the actual meeting;

receiving telemetry data that indicates Quality of Service (QOS) of the virtual meeting connectivity; and recommending a change in meeting format from a virtual meeting to an in-person meeting for at least a subset of the virtual meeting attendees based on the telemetry data indicating that virtual meeting connectivity for the at least a subset of the virtual meeting attendees is below a predetermined QoS threshold.

13. The computer-implemented method of claim 12, further comprising, for each of the in-person meeting attendees of the proposed meeting:

retrieving, from an enterprise server, historical calendar data associated with the in-person meeting attendee over a predetermined time interval; and generating a data profile for the in-person meeting attendee based at least in part on the historical calendar data, wherein determining the individual LWT values for the in-person meeting attendees of the proposed meeting is based at least in part on the data profile.

14. The computer-implemented method of claim 13, further comprising:

determining an alternate meeting time for the proposed meeting, based at least in part on the individual LWT values for the in-person meeting attendees of the proposed meeting; and transmitting, to the scheduler device, a notification of the alternate meeting time.

15. The computer-implemented method of claim 12, further comprising:

determining that the individual LWT value of one of the in-person meeting attendees of the proposed meeting is greater than a predetermined worktime value threshold and, in response thereto:

identifying an alternate meeting attendee to attend the proposed meeting in place of the in-person meeting attendee.

16. The computer-implemented method of claim 15, further comprising:

retrieving, from an enterprise server, a meeting attendee profile associated with the one of the in-person meeting attendees;

determining a meeting subject-matter, based at least in part on the meeting request; and analyzing the meeting attendee profile to identify a workgroup associated with the meeting subject-matter, wherein the alternate meeting attendee corresponds to a member of the workgroup.

17. The computer-implemented method of claim 12, further comprising:

retrieving, from an enterprise server, a meeting attendee profile associated with one of the in-person meeting attendees of the proposed meeting; and determining a travel time for the one of the in-person meeting attendees to travel to and from the first meeting location, wherein determining the individual LWT value for the one of the in-person meeting attendees includes the travel time.

18. The computer-implemented method of claim 17, further comprising:

determining that the individual LWT value for the one of the in-person meeting attendees is greater than a predetermined worktime value threshold; and recommending, for the one of the in-person meeting attendees, a meeting format change from the in-person meeting to the virtual meeting, based on determining that the individual LWT value for the one of the in-person meeting attendees exceeds the predetermined worktime value threshold.

19. The computer-implemented method of claim 12, wherein the environmental factors include at least one of a vehicle parking availability at the first meeting location, walking distance from a vehicle parking location to the first meeting location, or public road traffic conditions en route to the first meeting location.

20. The computer-implemented method of claim 12, wherein the one or more trained machine-learning algorithms include a supervised learning algorithm, an unsupervised learning algorithm, a semi-supervised learning algorithm, a naive Bayes algorithm, a Bayesian network algorithm, a decision tree algorithm, a neural network algorithm, a fuzzy logic model algorithm, or a probabilistic classification model algorithm.

* * * * *